United States Patent [19]
Tanabe

[11] Patent Number: 5,999,230
[45] Date of Patent: Dec. 7, 1999

[54] TONE CORRECTION APPARATUS FOR DIGITAL COLOR IMAGE SIGNAL

[75] Inventor: Kazuhiro Tanabe, Iruma, Japan

[73] Assignee: Hitachi Denshi Kabushiki Kaisha, Tokyo, Japan

[21] Appl. No.: 08/810,732

[22] Filed: Mar. 4, 1997

[30] Foreign Application Priority Data

Mar. 4, 1996 [JP] Japan .................................. 8-046263

[51] Int. Cl.$^6$ .................................................. H04N 9/64
[52] U.S. Cl. .......................... 348/649; 348/652; 348/651; 348/253; 382/167
[58] Field of Search .................... 348/649, 652, 348/653, 654, 645, 647, 646, 256, 253, 651, 650; 382/167; H04N 9/64

[56] References Cited

U.S. PATENT DOCUMENTS

| | | | |
|---|---|---|---|
| 3,739,078 | 6/1973 | Pugsley et al. | 358/520 |
| 3,740,459 | 6/1973 | Okada | 348/653 |
| 3,749,825 | 7/1973 | Moore | 348/652 |
| 3,852,807 | 12/1974 | Caprio et al. | 348/652 |
| 3,871,023 | 3/1975 | Caprio | 348/653 |
| 3,996,608 | 12/1976 | Harwood | 348/653 |
| 4,048,652 | 9/1977 | Rzeszewski | 348/653 |
| 4,051,510 | 9/1977 | Cochran | 348/653 |
| 4,285,005 | 8/1981 | Srivastava | 348/652 |
| 4,296,432 | 10/1981 | Engel et al. | 348/652 |
| 4,528,586 | 7/1985 | Lewis, Jr. et al. | 348/651 |
| 4,554,576 | 11/1985 | Kao | 348/651 |
| 4,558,351 | 12/1985 | Fling et al. | 348/651 |
| 4,679,072 | 7/1987 | Takayama | 358/520 |
| 4,837,612 | 6/1989 | Miller | 348/652 |
| 5,134,465 | 7/1992 | Ohki et al. | 348/649 |
| 5,255,076 | 10/1993 | Koyano | 348/653 |
| 5,719,639 | 2/1998 | Imamura | 348/577 |

Primary Examiner—Michael H. Lee
Assistant Examiner—Jean W. Désir
Attorney, Agent, or Firm—Antonelli, Terry, Stout & Kraus, LLP

[57] ABSTRACT

A tone correction apparatus corrects the tone of an input color image signal independently of each of a plurality of hue areas divided by a plurality of standard axes passing through a plurality of standard colors set on a hue coordinate system. The tone correction apparatus judges whether the hue of an input color image signal belongs to which one of first and second auxiliary hue areas, the first and second auxiliary hue areas being one of the plurality of hue areas divided by an auxiliary standard axis of an auxiliary standard color, and if the hue of the input color image signal is judged to belong to one of the first and second auxiliary hue areas, independently performs tone correction of the input color image signal with respect to color components along one standard axis of the plurality of standard axes surrounding the one auxiliary hue area to which the hue of the input color image signal belongs and along the auxiliary standard axis.

23 Claims, 18 Drawing Sheets

FIG. 4
PRIOR ART

| LEVEL RELATIONSHIP BETWEEN R,G, AND B SIGNALS | STANDARD COLORS | | AREA |
| --- | --- | --- | --- |
| | PRIMARY COLOR COMPONENTS | COMPLEMENTARY COLOR COMPONENTS | |
| R > B = G | R | NONE | 1ST AREA |
| R > B > G | R | Ma | |
| R = B > G | NONE | Ma | 2ND AREA |
| B > R > G | B | Ma | |
| B > G = R | B | NONE | 3RD AREA |
| B > G > R | B | Cy | |
| B = G > R | NONE | Cy | 4TH AREA |
| G > B > R | G | Cy | |
| G > B = R | G | NONE | 5TH AREA |
| G > R > B | G | Ye | |
| G = R > B | NONE | Ye | 6TH AREA |
| R > G > B | R | Ye | |
| R = B = G | NONE | NONE | NO COLOR COMPONENTS |

FIG. 16

| OUTPUT TERMINAL NO. OF 21A | OUTPUT SIGNAL FOR AREA ① | OUTPUT SIGNAL FOR AREA ② |
|---|---|---|
| 115 | $Rc - Yc \cdot \frac{\beta}{\alpha}$ | $Yc - Rc \cdot \frac{\alpha}{\beta}$ |
| 116 | $Yc$ | $Rc \cdot \frac{\alpha}{\beta}$ |
| 117 | $Yc \cdot \frac{\beta}{\alpha}$ | $Rc$ |

FIG. 17

| OUTPUT TERMINAL NO. OF 11A | OUTPUT SIGNAL FOR AREA ① | OUTPUT SIGNAL FOR AREA ② |
|---|---|---|
| 319 | $(Rc - Yc \cdot \frac{\beta}{\alpha}) \cdot Kr + Yc \cdot \frac{\beta}{\alpha} Kf$ | $Rc \cdot Kf$ |
| 320 | 0 | 0 |
| 321 | $-Yc \cdot Kf$ | $-(Yc - Rc \cdot \frac{\alpha}{\beta}) \cdot Ky - Rc \cdot \frac{\alpha}{\beta} Kf$ |

FIG. 20

| OUTPUT TERMINAL NO. OF 11B | OUTPUT SIGNAL FOR AREA ① | OUTPUT SIGNAL FOR AREA ② |
|---|---|---|
| 330 | $Yc + Kfh$ | $(Yc - Rc \cdot \frac{\alpha}{\beta}) \cdot Kyh + Rc \cdot \frac{\alpha}{\beta} \cdot Kfh$ |
| 331 | $-(Rc - Yc \cdot \frac{\beta}{\alpha}) \cdot Krh - Yc \cdot (1 + \frac{\beta}{\alpha}) \cdot Kfh$ | $-(Yc - Rc \cdot \frac{\alpha}{\beta}) \cdot Kyh - Rc \cdot (1 + \frac{\alpha}{\beta}) \cdot Kfh$ |
| 332 | $(Rc - Yc \cdot \frac{\beta}{\alpha}) \cdot Krh + Yc \cdot \frac{\beta}{\alpha} \cdot Kfh$ | $Rc - Kfh$ |

FIG. 19

| OUTPUT TERMINAL NO. OF 21B | OUTPUT SIGNAL FOR AREA ① | OUTPUT SIGNAL FOR AREA ② |
|---|---|---|
| 125 | $Rc - Yc \cdot \frac{\beta}{\alpha}$ | $Yc - Rc \cdot \frac{\alpha}{\beta}$ |
| 126 | $Yc$ | $Rc \cdot \frac{\alpha}{\beta}$ |
| 127 | $Yc \cdot (1 + \frac{\beta}{\alpha})$ | $Rc \cdot (1 + \frac{\alpha}{\beta})$ |
| 128 | $Yc \cdot \frac{\beta}{\alpha}$ | $Rc$ |

FIG. 22

| OUTPUT TERMINAL NO. OF 21A | OUTPUT SIGNAL FOR AREA ① | OUTPUT SIGNAL FOR AREA ② |
|---|---|---|
| 115 | 0 | 0 |
| 116 | Yc | $Rc \cdot \frac{\alpha}{\beta}$ |
| 117 | $Yc \cdot \frac{\beta}{\alpha}$ | Rc |

FIG. 23

| OUTPUT TERMINAL NO. OF 11A | OUTPUT SIGNAL FOR AREA ① | OUTPUT SIGNAL FOR AREA ② |
|---|---|---|
| 315 | 0 | 0 |
| 316 | 0 | 0 |
| 317 | $-Yc \cdot Kf$ | $-Rc \cdot \frac{\alpha}{\beta} \cdot Kf$ |
| 318 | $Yc \cdot \frac{\beta}{\alpha} \cdot Kf$ | $Rc \cdot Kf$ |
| OUTPUT TERMINAL NO. OF 11A | OUTPUT SIGNAL FOR AREA ① | OUTPUT SIGNAL FOR AREA ② |
| 319 | $Yc \cdot \frac{\beta}{\alpha} \cdot Kf$ | $Rc \cdot Kf$ |
| 320 | 0 | 0 |
| 321 | $-Yc \cdot Kf$ | $-Rc \cdot \frac{\alpha}{\beta} \cdot Kf$ |

FIG. 24

| OUTPUT TERMINAL NO. OF 21B | OUTPUT SIGNAL FOR AREA ① | OUTPUT SIGNAL FOR AREA ② |
| --- | --- | --- |
| 125 | 0 | 0 |
| 126 | $Yc$ | $Rc \cdot \frac{\alpha}{\beta}$ |
| 127 | $Yc + \frac{\beta}{\alpha} \cdot Yc$ | $Rc + \frac{\alpha}{\beta} \cdot Rc$ |
| 128 | $\frac{\beta}{\alpha} \cdot Yc$ | $Rc$ |

FIG. 25

| OUTPUT TERMINAL NO. OF 11B | OUTPUT SIGNAL FOR AREA ① | OUTPUT SIGNAL FOR AREA ② |
| --- | --- | --- |
| 325 | 0 | 0 |
| 326 | 0 | 0 |
| 327 | $Yc \cdot Kfh$ | $\frac{\alpha}{\beta} \cdot Rc \cdot Kfh$ |
| 328 | $-Yc \cdot (1 + \frac{\beta}{\alpha}) \cdot Kfh$ | $-Rc \cdot (1 + \frac{\alpha}{\beta}) \cdot Kfh$ |
| 329 | $\frac{\beta}{\alpha} \cdot Yc \cdot Kfh$ | $Rc \cdot Kfh$ |
| OUTPUT TERMINAL NO. OF 11B | OUTPUT SIGNAL FOR AREA ① | OUTPUT SIGNAL FOR AREA ② |
| 330 | $Yc \cdot Kfh$ | $Rc \cdot \frac{\alpha}{\beta} \cdot Kfh$ |
| 331 | $-Yc \cdot (1 + \frac{\beta}{\alpha}) \cdot Kfh$ | $-Rc \cdot (1 + \frac{\alpha}{\beta}) \cdot Kfh$ |
| 332 | $Yc \cdot \frac{\beta}{\alpha} \cdot Kfh$ | $Rc \cdot Kfh$ |

TONE CORRECTION APPARATUS FOR DIGITAL COLOR IMAGE SIGNAL

BACKGROUND OF THE INVENTION

1. Field of the Invention

The present invention relates to a tone correction apparatus for digital color image signals, and more particularly to a tone correction apparatus suitable for applications to broadcast business and the like which require relatively sophisticated processes.

2. Description of the Related Art

Various techniques of tone correction of color image signals have been known heretofore. Among these techniques, six-color independent tone correction is known.

With this six-color independent tone correction, the chromaticness (color saturation) and chromaticity (hue) of six standard colors, including R (red), Ma (magenta), B (blue), Cy (cyan), G (green), and Ye (yellow), are independently adjusted without changing the white balance, i.e., without coloring an achromatic signal. A specific example of six-color independent tone correction is described in JP-A-3-26658 and JP-A-3-272294.

An example of conventional six-color independent tone correction will be described.

FIG. 1 shows an example of a conventional six-color independent tone correction apparatus.

In FIG. 1, three terminals $R_{IN}$, $G_{IN}$, and $B_{IN}$ are input terminals to which three R, G, and B digital signals constituting a color image signal to be tone corrected are supplied. $R_{OUT}$, $G_{OUT}$, and $B_{OUT}$ are output terminals from which corrected R, G, and B signals are output.

Three R, G, and B digital signals supplied to the input terminal $R_{IN}$, $G_{IN}$, and $B_{IN}$ are input to comparators 1 to 3 which compare levels of R and G signals, of G and B signals, and of B and R signals. The comparators 1 to 3 output signals representative of the comparison results. A hue area determination unit 4 sequentially judges as shown in FIG. 4 a hue area of each input signal in accordance with the comparison results of the comparators 1 to 3.

FIG. 2 is a conceptual diagram showing hue areas. In this diagram, an input signal is classified into six hue areas which are partitioned by using axes or straight lines extending from the center to respective standard colors, as standard axes (standard lines). In accordance with the comparison results of the comparators 1 to 3, the hue area determination unit 4 discriminates between a color signal having a highest signal level, a color signal having a lowest signal level, and a color signal having a signal level or intermediate signal level between the highest and lowest signal levels. Since there are color signals having the same signal level, the priority order is set between R, G, and B to judge the hue area. In this example, the priority is set in the order of R, G, and B.

The hue of an input color image signal is judged whether it belongs to which hue area among the six hue areas, in accordance with a combination of the kind of a color signal having the highest level and the kind of a color signal having the second highest level.

FIG. 5 is a flow chart illustrating the operation of the apparatus having the structure shown in FIG. 1. The operation of the apparatus will be described with reference to this flow chart.

The hue area determination unit 4 executes the processes at Step 501 to 504 shown in FIG. 5. Specifically, in accordance with the signals representative of the comparison results of the comparators 1 to 3, the hue area determination unit 4 detects the kind of a color signal having the highest level among the three R, G, and B color signals and the kind of a color signal having the second highest level. There are six combinations of kinds of these color signals, each combination being composed of a primary color of a color signal having the highest level and a complementary color between the color signal having the highest level and a color signal having a second highest level. These six combinations include (R:Ma), (B:Ma), (B:Cy), (G:Cy), (G:Ye), and (R:Ma). In accordance with the detection results of these levels, it can be judged whether an input image signal belongs to which hue area shown in FIG. 2.

First, a color signal having the highest level and a color signal having the second highest level are detected. Assuming that the relationship between levels of color signals is as shown in FIG. 3, the color signal having the highest level is R and the color signal having the second highest level is G.

Next, by using these determination results, a table stored in the hue area determination unit 4 shown in FIG. 4 is searched. In this example, since the color signal having the highest level is R and the color signal having the second highest level is G, the level relationship is R>G>B which corresponds to the relationship at the second lowest row of the table shown in FIG. 4. Therefore, the hue area of this input signal corresponds to the 6th area shown in FIG. 2.

Similarly, if the level relationship of an input signal is R>B>G, the hue area of the input signal corresponds to the 1st area, if B>G>R, then the 3rd area, if G>B>R, then the 4th area, and if G>R>B, then the 5th area.

In the above manner, the hue area determination unit 4 sequentially judges the hue area of each input digital signal, and supplies a signal 100 representative of the determination result to a primary/complementary color component calculator circuit 5, to a constant selector circuit 6, and to a data selector circuit 11.

In response to the signal 100 from the hue area determination unit 4, the primary/complementary color component calculator circuit 5 sequentially calculates primary and complementary color components of an input digital signal. The primary/complementary color component calculator circuit 5 includes selectors 51 to 53 and subtractors 55 and 56.

The selector 51 selects a color signal having the highest level among R, G, and B signals in accordance with the signal 100 representative of the determination result supplied from the hue area determination unit 4, and supplies the selected color signal to the subtractor 55. Namely, if the determination result indicated by the signal 100 from the hue area determination unit 4 is 1st, 2nd, 3rd, 4th, 5th, or 6th area, the selector 51 selects R, B, B, G, G, or R signal, respectively.

The selector 52 selects a color signal having the intermediate level among R, G, and B signals in accordance with the signal 100 representative of the determination result supplied from the hue area determination unit 4, and supplies the selected color signal to an inverted input terminal of the subtractor 55 and a non-inverted input terminal of the subtractor 56. Namely, if the determination result indicated by the signal 100 from the hue area determination unit 4 is 1st, 2nd, 3rd, 4th, 5th, or 6th area, the selector 52 selects B, R, G, B, R, or G signal, respectively.

The selector 53 selects a color signal having the lowest level among R, G, and B signals in accordance with the signal 100 representative of the determination result supplied from the hue area determination unit 4, and supplies the selected color signal to the inverted input terminal of the subtractor 56. Namely, if the determination result indicated by the signal 100 from the hue area determination unit 4 is 1st, 2nd, 3rd, 4th, 5th, or 6th area, the selector 53 selects G, G, R, R, B, or B signal, respectively.

In the above manner, as shown in Steps 504 to 514 in FIG. 5, the primary/complementary color component calculator circuit 5 calculates the primary color component level and the complementary color component level as shown in FIG. 3 in accordance with each determination result indicated by the signal 100 supplied from the hue area determination unit 4. The primary color component level is the level of the color signal having the highest level subtracted by the level of the color signal having the second highest level, and the complementary color component level is the level of the color signal having the second highest level subtracted by the level of the color signal having the lowest level.

The color having the highest level corresponds to the primary color, and the components of the color signal having the lowest level correspond to the white components. Each complementary color can be determined from the information of the color having the highest level and the color having the lowest level. Accordingly, as shown in FIG. 4, the primary and complementary color components can be determined.

In the example shown in FIG. 3, since R has the highest level and G has the intermediate level, R constitutes the primary color components and Ye (yellow) which is an intermediate hue between R and G constitutes the complementary components. The quantity of the primary color components is R–G, the quantity of the complementary color components is G–R, and the quantity of B having the lowest level is the quantity of the white color components.

In the table shown in FIG. 4, although the lowest level of each color signal is not necessary for the determination of a hue area, it is necessary for the calculation of the complementary color components. This is the reason why the lowest level is written in the table of FIG. 4.

The signal representative of the determination result of a hue area given by the hue area determination unit 4 is also supplied to the constant selector circuit 6 which selects a specific gain constant in accordance with the determination result. The selected gain constant is supplied to multipliers 210 to 213. The primary and complementary color component quantities calculated by the calculator circuit 5 are multiplied by selected gain constants to correct the primary and complementary components.

For this correction, the constant selector circuit 6 is preset with specific gain constants corresponding to the 1st to 6th hue areas.

The constant selector circuit 6 includes registers 218 to 229 and selectors 214 to 217.

As described above, the subtractor 55 outputs a signal representative of the level of the primary color components of an input color image signal to supply it to two multipliers 210 and 211.

The other subtractor 56 outputs a signal representative of the level of the complementary color components of an input color image signal to supply it to two multipliers 212 and 213.

In accordance with the color signal having the highest level among R, G, and B signals which color signal corresponds to the determination result by the hue area determination unit 4, the selector 214 selects one of the registers 218 to 220 which store chromaticness adjustment coefficients K1 to K3 to be used for the color signal having the highest level. Similarly, in accordance with the color signal having the highest level among R, G, and B signals which color signal corresponds to the determination result by the hue area determination unit 4, the selector 215 selects one of the registers 218 to 220 which store chromaticness adjustment coefficients K4 to K6 to be used for the color signal having the highest level. The coefficients read from the registers selected by the selectors 214 and 215 are supplied to the multipliers 210 and 211.

In accordance with a complementary color (Cy for R, Ma for G, and Ye for B) not containing the color signal having the lowest level among R, G, and B signals which color signal corresponds to the determination result by the hue area determination unit 4, the selector 216 selects one of the registers 224 to 226 which store chromaticness adjustment coefficients K7 to K9 to be used for the complementary color. Similarly, in accordance with a complementary color identified from the determination result by the hue area determination unit 4, the selector 217 selects one of the registers 227 to 229 which store chromaticness adjustment coefficients K10 to K12 to be used for the complementary color. The coefficients read from the registers selected by the selectors 214 and 215 are supplied to the multipliers 212 and 213.

As above, the multiplier 210 outputs a signal representative of the primary color components multiplied by the chromaticness adjustment coefficient corresponding to this primary color, and the multiplier 211 outputs a signal representative of the primary color components multiplied by the chromaticness adjustment coefficient corresponding to this primary color. On the other hand, the multiplier 212 outputs a signal representative of the complementary color components multiplied by the chromaticness adjustment coefficient corresponding to this complementary color, and the multiplier 213 outputs a signal representative of the complementary color components multiplied by the chromaticness adjustment coefficient corresponding to this complementary color.

Of these outputs, an output of the multiplier 210 is supplied to a selector 231 constituting the data selector circuit 11 which is controlled by the hue area determination unit 4. The output of the multiplier 231 is added, via one of adder circuits 33 to 35 selected by the selection operation of the selector 231, to one of the original R, G, and B signals supplied from a corresponding one of the input terminals $R_{IN}$, $G_{IN}$, and $B_{IN}$ and judged to be the primary color by the hue area determination unit 4.

An output of the multiplier 211 and a polarity inverted output inverted by an inverter 230 are supplied to the selector 231 constituting the data selector circuit 11 controlled by the hue determination circuit 4. The output of the multiplier 211 and the output of the inverter 230 are added, via two of adder circuits 33 to 35 selected by the selection operation of the selector 231 excepting the adder circuit to which the output of the multiplier 210 is supplied, to two of the original R, G, and B signals supplied from corresponding two of the input terminals $R_{IN}$, $G_{IN}$, and $B_{IN}$ excepting the color signal judged to be the primary color by the hue area determination unit 4. In this manner, by changing the coefficients stored in the registers 218 to 223, the chromaticness and hue of each primary color can be independently adjusted as illustrated in FIG. 5.

Specifically, if the hue area of an input signal is in the 1st area, the chromaticness of the primary color can be adjusted as explained at Step 528, and the hue thereof can be adjusted as explained at Step 530. If the hue area of an input signal is in the 6th area, the chromaticness of the primary color can be adjusted as explained at Step 536, and the hue thereof can be adjusted as explained at Step 538. If the hue area of an input signal is in the 4th area, the chromaticness of the primary color can be adjusted as explained at Step 546, and the hue thereof can be adjusted as explained at Step 548. If the hue area of an input signal is in the 5th area, the chromaticness of the primary color can be adjusted as explained at Step 554, and the hue thereof can be adjusted as explained at Step 556. If the hue area of an input signal is in the 3rd area, the chromaticness of the primary color can be adjusted as explained at Step 562, and the hue thereof can be adjusted as explained at Step 564. If the hue area of an input signal is in the 2nd area, the chromaticness of the primary color can be adjusted as explained at Step 570, and the hue thereof can be adjusted as explained at Step 572.

The outputs of the multipliers 212 and 213 are supplied to an adder 239 and a subtractor 240. The adder 239 adds the outputs of the multipliers 212 and 213, and the subtractor 240 subtracts the output of the multiplier 213 from the output of the multiplier 212. The outputs of the adder 239 and the subtractor 240 are supplied to a selector 232, and added to respective ones of R, G, and B signals (R and G for Ye, G and B for Cy, and R and B for Ma) constituting the complementary colors not containing the color signal having the lowest level judged by the hue area determination unit 4, by respective ones of adders 36 to 38.

In this manner, by changing the coefficients stored in the registers 224 to 229, the chromaticness and hue of each complementary color can be independently adjusted as illustrated in FIG. 5.

Specifically, if the hue area of an input signal is in the 1st area, the chromaticness of the complementary color can be adjusted as explained at Step 532, and the hue thereof can be adjusted as explained at Step 534. If the hue area of an input signal is in the 6th area, the chromaticness of the complementary color can be adjusted as explained at Step 540, and the hue thereof can be adjusted as explained at Step 542. If the hue area of an input signal is in the 4th area, the chromaticness of the complementary color can be adjusted as explained at Step 550, and the hue thereof can be adjusted as explained at Step 552. If the hue area of an input signal is in the 5th area, the chromaticness of the complementary color can be adjusted as explained at Step 558, and the hue thereof can be adjusted as explained at Step 560. If the hue area of an input signal is in the 3rd area, the chromaticness of the complementary color can be adjusted as explained at Step 566, and the hue thereof can be adjusted as explained at Step 560. If the hue area of an input signal is in the 2nd area, the chromaticness of the complementary color can be adjusted as explained at Step 574, and the hue thereof can be adjusted as explained at Step 576.

The operation of this conventional example will be described in more detail by using a specific example.

As already described, of the coefficients to be stored in the registers 218 to 229, the coefficients K1 to K3 are used for adjusting the chromaticness of each of R, G, and B primary colors, the coefficients K4 to K6 are used for adjusting the hue of each primary color, the coefficients K7 to K9 are used for adjusting the chromaticness of each of Ye, Cy, and Ma complementary colors, and the coefficients K10 to K12 are used for adjusting the hue of each complementary color.

It is assumed here that the digital color image signal supplied from the input terminals $R_{IN}$, $G_{IN}$, and $B_{IN}$ is represented by:

R:G:B=0.8:0.4:0.4

The hue area determination unit 4 judges that the colors of the input signal are R and Ma because the R signal level is highest and the G signal level is lowest (in this case, although the levels of the G and B signals are the same, it is judged from the above-described priority order that the G signal level is lowest).

The selectors 51, 52, and 53 select corresponding R, G, and B signals. The subtractor 55 outputs an (R−B) signal having a signal level of 0.4, i.e., the primary signal components R' of the image signal, and supplies it to the multiplier 210. The output of the subtractor 56 has a level of 0, and so the complementary color signal components are not output.

In this case, since the judged color is R, the selectors 214 and 215 select the registers 218 and 221, respectively, which respectively store the coefficients K1 and K2 used for adjusting the chromaticness and hue of R color, respectively. Therefore, the multipliers 210 and 211 output the primary color components multiplied by the R color chromaticness and hue adjusting coefficients, i.e., R×K1 signal and R×K4 signal.

Further, since the color of the image signal is R, the selector 231 performs a selection operation so that an output of the multiplier 210 is added to the R signal by the adder 33, and an output of the multiplier 211 and an output of the inverter 230 are added to the G and B signals by the adders 34 and 35, respectively.

Therefore, the R signal of the image signal is added with a correction portion which is the primary color signal components R' of the image signal multiplied by the R color chromaticness adjusting coefficient K1, the B signal is added with a correction portion which is the primary color signal components R' multiplied by the R color hue adjusting coefficient K4, and the G signal is subtracted by this correction portion. As a result, R, G, and B signals of the digital color image signal whose chromaticness of the R signal was corrected by the coefficient K1 and hue was corrected by the coefficient K4, are output from the output terminals $R_{OUT}$, $G_{OUT}$, and $B_{OUT}$. With the adjustment using the coefficients K1 and K4, the chromaticness and hue of the R signal can be adjusted independently from other color signals.

It is assumed that a color image signal is next input which has a level ratio of color signals of:

R:G:B=0.8:0.8:0.4

The hue area determination unit 4 judges that the colors of the input signal are R and Ye because the R signal level is highest and the B signal level is lowest (in this case, although the levels of the R and G signals are the same, it is judged from the above-described reason that the R signal level is highest).

The selectors 5, 6, and 7 select corresponding R, G, and B signals. The subtractor 56 outputs a (G−B) signal having a signal level of 0.4, i.e., the complementary signal components Ye' of the image signal, and supplies it to the multipliers 212 and 213. The output of the subtractor 55 has a level of 0, and so the primary color signal components are not output.

In this case, since the judged color is Ye, the selectors 216 and 217 select the registers 224 and 227, respectively, which respectively store the coefficients K7 and K10 used for adjusting the chromaticness and hue of Ye color, respectively. Therefore, the multipliers 212 and 213 output the complementary color components multiplied by the Ye color chromaticness and hue adjusting coefficients, i.e., Ye×K7 signal and Ye×K10 signal.

Further, since the color of the image signal is Ye, the selector 232 performs a selection operation so that an addition result of an output of the multiplier 212 and an output of the multiplier 213 added by the adder 239 is added to the R signal by the adder 36 and so that a subtraction result of an output of the multiplier 213 from an output of the multiplier 212 is added to the G signal by the adder 37.

Therefore, the R signal of the image signal is added with a correction portion which is the complementary color signal components Ye' of the image signal multiplied by the Ye color chromaticness adjusting coefficient K7 and added further to the components Ye' multiplied by the Ye color hue adjusting coefficient K10, the G signal is added with a correction portion which is the complementary color signal components Ye' multiplied by the Ye color hue adjusting coefficient K7 and subtracted further by the components Ye' multiplied by the Ye color hue adjusting coefficient K10. As a result, R, G, and B signals of the digital color image signal whose chromaticness of the Ye color signal was corrected by the coefficient K7 and hue was corrected by the coefficient K10, are output from the output terminals $R_{OUT}$, $G_{OUT}$, and $B_{OUT}$. With the adjustment using the coefficients K7 and K10, the chromaticness and hue of the Ye signal can be adjusted independently from other color signals.

In this conventional example, as apparent from the above-described specific example, if the input signal is composed of only one of the primary and complementary color signals, then the output of the other color signal is 0. Therefore, the above-described operation is not affected in particular. If the input signal is composed of a mixture of both the primary and complementary color signals, the above-described operations are executed independently in parallel.

With this conventional example, a digital tone correction apparatus can be realized which can correct six colors independently by using ten adders/subtractors and four multipliers.

As described above, for tone correction of an R signal, for example, in the chromaticness direction, the primary color component quantity (R−G) multiplied by a specific constant $K_r$ is added to an image signal R.

If the constant $K_r$ is in the range from −1 to +1, this correction does not change a level difference (complementary color components) between the intermediate level and the lowest level and a quantity (white color components) of the lowest level.

For tone correction of a signal Ye in the chromaticness direction, the complementary color component quantity (G−B) multiplied by a specific constant $K_y$ is added to image signals R and G.

Also in this case, if the constant $K_y$ is in the range from −1 to +1, this correction does not change a level difference (primary color components) between the highest level and the intermediate level and a quantity (white color components) of the lowest level.

Therefore, if the constants $K_r$ and $K_y$ are properly selected, correction of the primary color R and the complementary color Ye in the chromaticness direction can be performed independently while preserving the white balance.

SUMMARY OF THE INVENTION

The above-described conventional technique works well on colors near six standard colors including R, Ma, B, Cy, G, and Ye, however, it considers less the correction of intermediate colors between these standard colors, for example, human flesh tints or the like cannot be reproduced precisely.

A human flesh tint has a hue intermediate between R and Ye. The flesh tint is likely to give a vivid impression on a viewer, and a difference between tones is easily recognized. In order to obtain colors like flesh tints, a precise tone correction becomes necessary. However, since the flesh tint is an intermediate color, conventional techniques are difficult to perform fine correction of flesh tints.

In broadcast business, a number of television cameras are used and switched during operation in many cases. If each camera produces a different tone of flesh tints, a viewer feels restless. Although it is necessary to preadjust cameras to produce the same tone, conventional techniques are difficult to deal with it.

FIG. 6 shows the gain characteristics of R and Ye color corrections in the chromaticness direction according to conventional techniques. As seen from this graph, even with conventional techniques, tone correction of a flesh color is possible if R and Ye color corrections are made strongly. However, in this case, the tone of R and Ye in the chromaticness direction is degraded greatly and this approach cannot be used in practice.

As shown by broken lines in FIG. 6, if the Ye and R correction constants in the chromaticness direction are set to $K_{y1}$ and $K_{r1}$ (gains $G_{y1}$ and $G_{r1}$), the gain of an input signal in the 6th hue area has the characteristics indicated by a two-dot phantom chain line 7a and the flesh tint gain is $G_{f1}$. If the Ye and R correction constants in the chromaticness direction are set larger to $K_{y2}$ and $K_{r2}$ (gains $G_{y2}$ and $G_{r2}$) in order to increase the flesh tint tone in the chromaticness direction, the gain of an input signal in the 6th hue area has the characteristics indicated by a one-dot phantom chain line 7b. In this case, the flesh tint gain is $G_{f2}$ and the flesh tint tone increases in the chromaticness direction. However, the gains of R and Ye also increase in the chromaticness direction, and the tones of R and Ye in the chromaticness direction shift largely from the intrinsic tones. Conventional techniques are therefore difficult to perform effective tone correction of flesh tints while minimizing the influence upon R and Ye. Namely, it is difficult to perform effective tone correction of an intermediate color while minimizing the influence upon standard colors.

According to one aspect of the present invention, a tone correction apparatus for correcting the tone of an input color image signal independently of each of a plurality of hue areas divided by a plurality of standard axes passing through a plurality of standard colors set on a hue coordinate system, includes:

a unit for judging whether the hue of an input color image signal belongs to which one of first and second auxiliary hue areas, the first and second auxiliary hue areas being one of the plurality of hue areas divided by an auxiliary standard axis of an auxiliary standard color; and a unit for independently performing, when the judging unit judges that the hue of the input color image signal belongs to one of the first and second auxiliary hue areas, tone correction of the input color image signal with respect to color components along one standard axis of the plurality of standard axes surrounding the one auxiliary hue area to which the hue of the input color image signal belongs and along the auxiliary standard axis.

According to one example of the invention, the tone correction unit performs tone correction of the color component along the auxiliary standard axis, by decomposing the component along the auxiliary standard axis into components along the two standard axes surrounding the auxiliary standard axis, and by performing tone correction of the factorized components along the two standard axes.

According to another example of the invention, the tone correction unit independently performs tone correction of chromaticness of each component along the one standard axis and along the auxiliary standard axis, and independently performs tone correction of chromaticity of each component along the one standard axis and along the auxiliary standard axis.

According to still another example of the invention, the plurality of standard axes include six standard axes each passing through each hue of standard colors including red, magenta, blue, cyan, green, and yellow, and the auxiliary standard color is flesh color.

As above, according to the present invention, in addition to the six standard colors of the abovedescribed conventional techniques, a new standard color is used as the auxiliary standard color. The tone of the auxiliary standard color is corrected independently from other standard colors. Effective tone correction of the auxiliary standard color is therefore possible while minimizing the influence upon the hues of the other standard colors.

For example, flesh tint auxiliary color is set between R and Ye. An input image signal in the hue area between R and flesh tint is expressed as a composition of R components and flesh tint components, and an input image signal in the hue area between Ye and flesh tint is expressed as a composition of Ye components and flesh tint components. The tone correction of flesh tint components of the input image signal is performed independently from R and Ye components. In this manner, effective tone correction of flesh tint becomes possible while minimizing the influence upon the hues of R and Ye.

If the hue of the added auxiliary standard color is changed, effective tone correction of all colors can be executed effectively.

The auxiliary standard color to be added is not limited only to flesh tint, but any intermediate color in each hue area of six colors may be used.

According to another aspect of the invention, a tone correction apparatus for correcting the tone of an input color image signal independently of each of a plurality of hue areas (e.g., 1st to 6th areas) divided by a plurality of standard axes passing through a plurality of standard colors (e.g., R, Ma, B, Cy, G, Ye) set on a hue coordinate system, includes:

means for judging whether the hue of an input color image signal belongs to which one of first and second auxiliary hue areas (e.g., areas (1) and (2)), the first and second auxiliary hue areas being one of the plurality of hue areas divided by an auxiliary standard axis of an auxiliary standard color (e.g., F);

first tone correction means for independently performing, when the judging means judges that the hue of the input color image signal belongs to one of the first and second auxiliary hue areas, tone correction of the input color image signal with respect to color components along one standard axis (e.g., R or Ye standard axis) of the plurality of standard axes surrounding the one auxiliary hue area to which the hue of the input color image signal belongs and along the auxiliary standard axis (e.g., F standard axis); and second tone correction means for independently performing, when the judging means judges that the hue of the input color image signal belongs to an area other than the first and second auxiliary hue areas, tone correction of the hue components of the input color image signal with respect to color components along one of the plurality of standard axes corresponding to the hue of the input color image signal.

For example, in addition to the tone correction along the conventional R and Ye standard axes in the 6th area, the tone correction along the standard axis of the new auxiliary standard color F can be independently performed. Since the tone correction of the input image signal in the 1st to 5th areas is possible along the standard axis direction as in the conventional manner, the tone correction of seven colors can be independently performed. Accordingly, if the new auxiliary standard color is flesh tint, the tone correction of flesh color can be performed without any influence upon R and Ye.

BRIEF DESCRIPTION OF THE DRAWINGS

FIG. 4 is a diagram showing an example of a table to be used for judging a hue area in tone correction operation.

FIG. 16 is a diagram showing output signals of the data selection adder/subtractor circuit for chromaticness in which tone correction in the 6th area is executed by the embodiment apparatus shown in FIG. 8.

FIG. 17 is a diagram showing output signals of the data selection adder circuit for chromaticness in which tone correction in the 6th area is executed by the embodiment apparatus shown in FIG. 8.

FIG. 19 is a diagram showing output signals of the data selection adder/subtractor circuit for chromaticity shown in which tone correction in the 6th area is executed by the embodiment apparatus shown in FIG. 8.

FIG. 20 is a diagram showing input and output signals of the data selection adder circuit for chromaticity in which tone correction in the 6th area is executed by the embodiment apparatus shown in FIG. 8.

FIG. 22 is a diagram showing output signals of the data selection adder/subtractor circuit for chromaticness performing tone correction of only flesh tint, according to another embodiment.

FIG. 23 is a diagram showing output signals of the data selection adder circuit for chromaticness tone correction of only flesh tint, according to another embodiment.

FIG. 24 is a diagram showing output signals of the data selection adder/subtractor circuit for chromaticity performing tone correction of only flesh tint, according to the other embodiment.

FIG. 25 is a diagram showing output signals of the data selection adder circuit for chromaticity performing tone correction of only flesh tint, according to the other embodiment.

DETAILED DESCRIPTION OF THE PREFERRED EMBODIMENTS

Embodiments of a tone correction apparatus for digital color image signals will be described in detail with reference to the accompanying drawings. According to the invention, in addition to the six standard colors used by the above-described conventional technique, at least one auxiliary standard color (i.e., an intermediate color between optional adjacent standard colors) can be set as a new standard color. Therefore, in addition to tone correction using the six standard colors, tone correction using the auxiliary standard color (intermediate color) can be executed.

Figure 7:
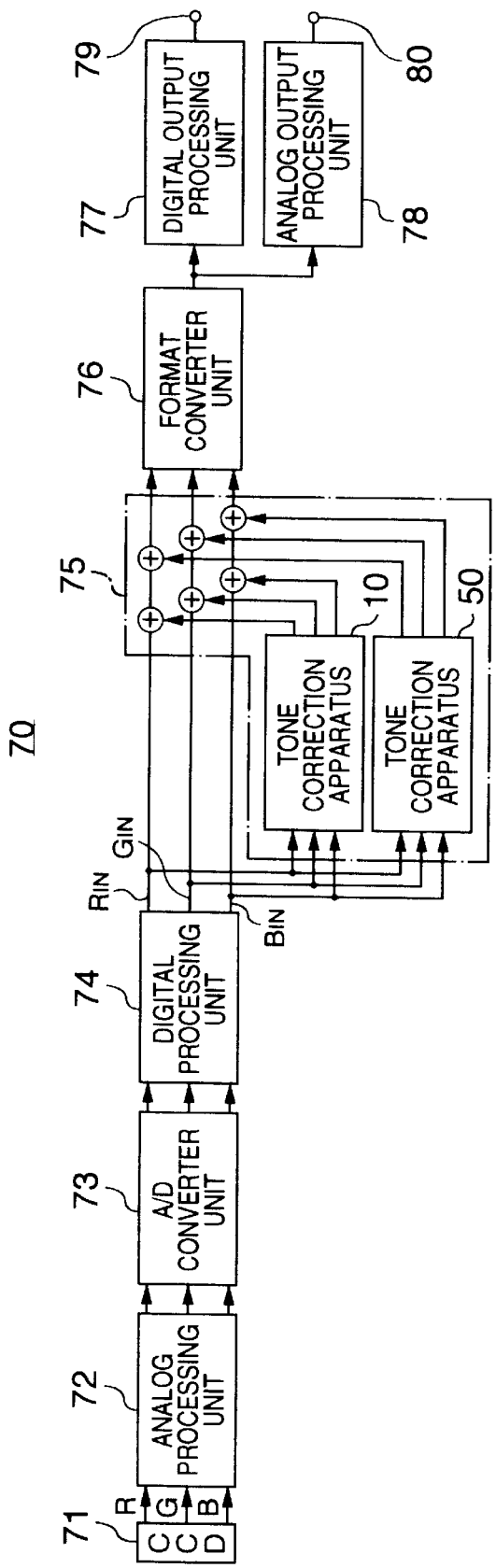
FIG. 7 is a block diagram showing an example of the structure of a television camera applied to which is a tone correction apparatus for digital color image signals of this invention.

FIG. 7 is a block diagram showing the outline structure of a television camera 70 which is one example to which the tone correction apparatus for digital color signals of this invention is applicable.

In FIG. 7, image signals R, G, and B of a subject taken with an image pickup element such as a CCD 71 are supplied to an analog processing unit 72 by which the image signals are processed in an analog way, then the processed image signals are converted into digital signals by an A/D converter unit 72. The digital signals output from the A/D converter unit 72 are processed in a digital way such as gamma correction and enhancement by a digital processing unit 74 which outputs image signals $R_{IN}$, $G_{IN}$, and $B_{IN}$. The tones of these image signals are corrected by a tone correction unit 75, and then the formats of the image signals are converted by a format converter unit 76. An output of the format converter unit 76 is supplied to a digital processing unit 77 and an analog processing unit 78 whose outputs are supplied to a digital output terminal 79 and an analog output terminal 80, respectively.

The tone correction unit 75 has a tone correction apparatus 10 in conformity with the conventional six-color independent tone correction method and a tone correction apparatus 50 of this invention. In this example, in addition to tone correction by the tone correction apparatus 10, tone correction by the tone correction apparatus 50 of this invention is executed.

In FIG. 7, although the tone correction unit 75 and the digital processing unit 74 are drawn separately, the tone correction unit 75 is provided in actual in the digital processing unit 74 at an arbitrary position of the digital processing unit 74.

Figure 8:
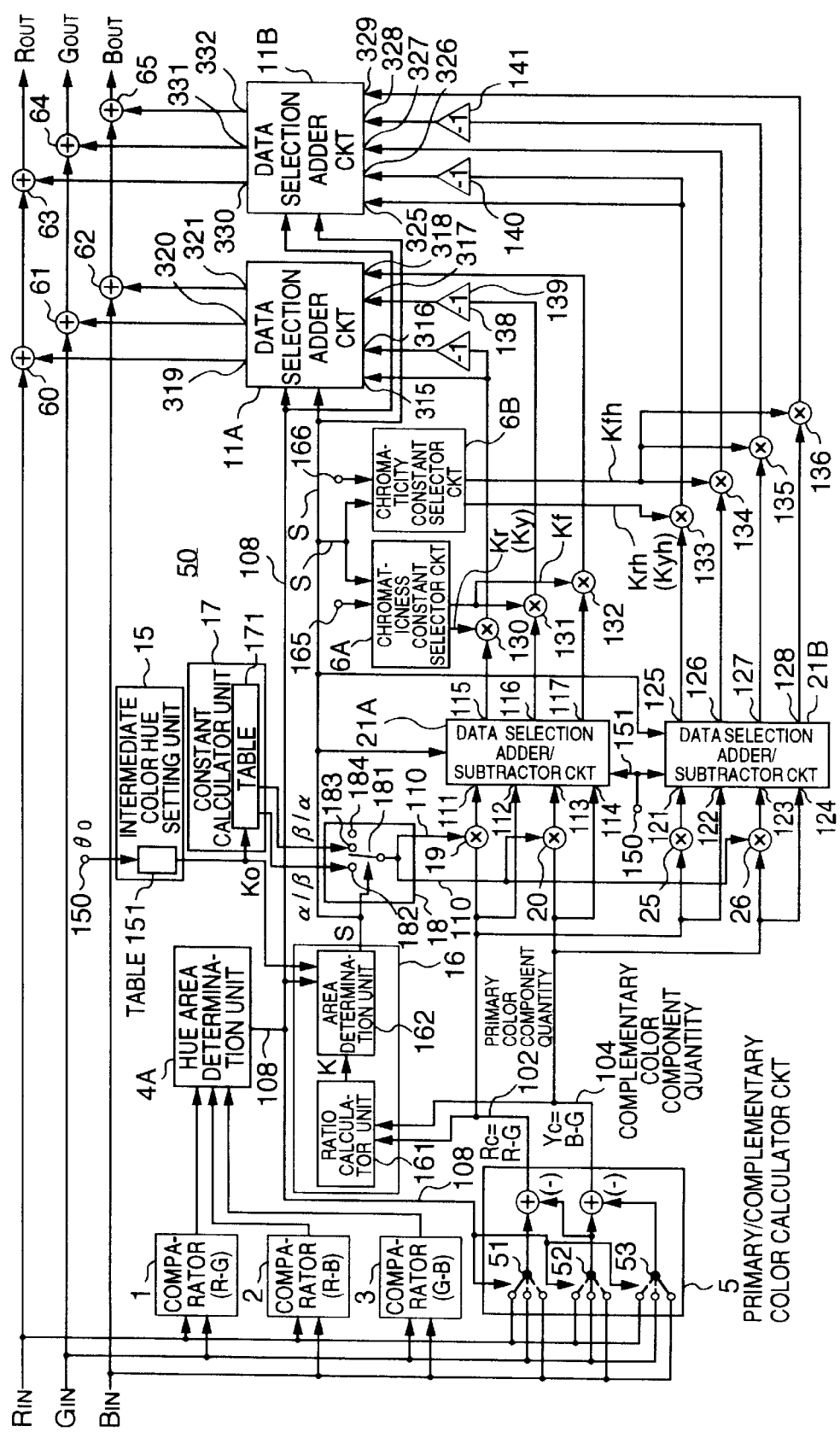
FIG. 8 is a block diagram showing the structure of a tone correction apparatus for digital color image signals according to an embodiment of the invention.

FIG. 8 is a block diagram showing an embodiment of the tone correction apparatus for digital color image signals of this invention. The tone correction apparatus 50 of this embodiment can perform tone correction by using an optional auxiliary standard color. By adding the tone correction apparatus 50 of this embodiment to the conventional tone correction apparatus shown in FIG. 1, tone correction using the auxiliary standard color (intermediate color) can be performed in addition to the tone correction using the six standard colors described above.

In the example shown in FIG. 7, although the tone correction apparatus 50 is connected in parallel with the tone correction apparatus 10, the tone correction apparatus 50 may be connected in series with the tone correction apparatus 10.

Next, the principle of the invention will be described.

Figure 9:
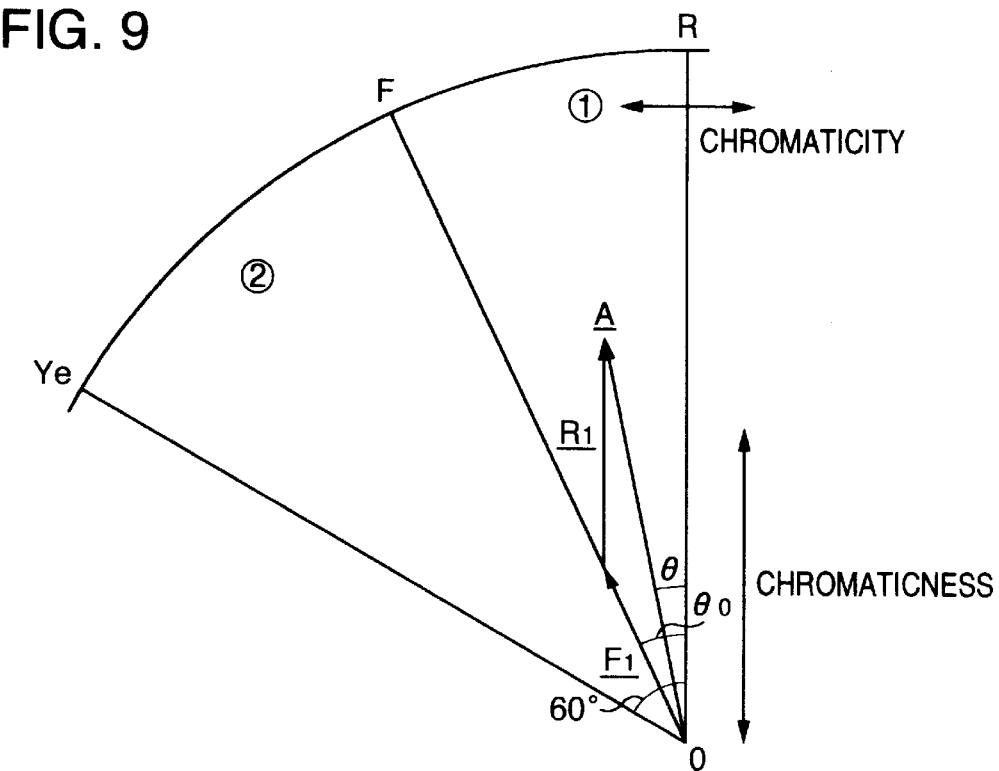
FIGS. 9 and 10 are hue diagrams of new standard colors used with the tone correction apparatus for digital color image signals according to the embodiment of the invention.
Figure 10:
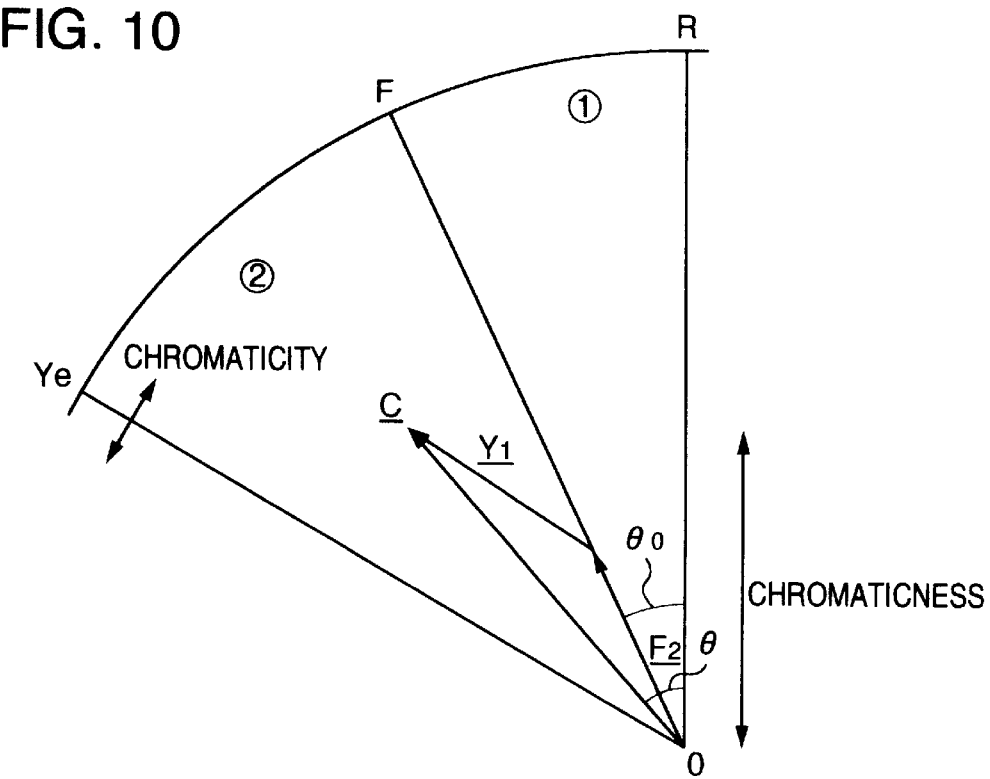

FIGS. 9 and 10 are diagrams showing chromaticness (color saturation degree) and chromaticity (hue) illustrating the operation principle of this invention. In these diagrams, the direction moving away from the origin O indicates the chromaticness and the direction perpendicular to the chromaticness (direction of drawing a circle) indicates the chromaticity.

The invention is applicable to tone correction of any intermediate color. However, it is supposed that the invention is applied in many cases to tone correction of flesh tint in particular.

Therefore, in this embodiment, tone correction of mainly flesh tint will be described illustratively.

The hue of flesh tint is positioned in an area between R and Ye, i.e., in the 6th area. In FIGS. 9 and 10, therefore, only the 6th area from R (red) to Ye (yellow) is shown and the hue of flesh tint is represented by a point F.

This point F corresponds to the auxiliary standard color (intermediate color) F.

In this case, the 6th area is divided into two auxiliary hue areas (1) and (2) by an axis extending from the center point O to the auxiliary standard color point F, i.e., by an auxiliary standard axis.

The hue of an input image signal is judged by dividing the 6th area into the area (1) between R and F and the area (2) between F and Ye.

In this embodiment, since the input signal belongs to the 6th area, the primary color components and the complementary color components of the input signal are given by:

Primary color components=$R-G=Rc$

Complementary color components=$G-B=Yc$ where R, G, and B are R, G, and B components of the input image signal.

Next, it is determined whether the hue of the input image signal belongs to which of the areas (1) and (2), to perform tone correction at the areas (1) and (2) independently as in the following.

Correction of Image Signal Belonging to the Area (1)

In FIG. 9, point A is the coordinate position of the input image signal which is represented by a vector $\underline{A}$. This vector $\underline{A}$ is represented by a composition of an R component vector $\underline{R}$ and a flesh tint component vector $\underline{F}$.

$$\underline{A}=\underline{R}_1+\underline{F}_1 \qquad (1)$$

Of the fundamental factors of color, including luminance, chromaticness, and chromaticity, the chromaticness and chromaticity are related to tone of each color. In a color coordinate system, the direction extending from the origin to each color (R, G, B, Ma, Cy, Ye) corresponds to the chromaticness, and the direction perpendicular to the chromaticness direction indicates hue and corresponds to the chromaticity. All calculations are based on this color coordinate system. The color coordinate system have the following four basic theorems.

$$\underline{R}+\underline{G}+\underline{B}0 \qquad (a)$$

$$\underline{Cy}=-\underline{R}=\underline{G}+\underline{B} \qquad (b)$$

$$\underline{Ma}=-\underline{G}=\underline{R}+\underline{B} \qquad (c)$$

$$\underline{Y}=-\underline{B}=\underline{R}+\underline{G} \qquad (d)$$

where $\underline{R}$, $\underline{G}$, $\underline{B}$, $\underline{Cy}$, $\underline{Ma}$, and $\underline{Y}$ are fundamental vectors of R, G, B, Cy, Ma, and Ye respectively.

A gain constant for adjusting R in the chromaticness direction is represented by Kr, and a gain constant for adjusting flesh tint in the chromaticness direction is represented by Kf. In order to correct the tone of R in the chromaticness direction, $|R_1|\times Kr$ is added to R in the R chromaticness direction, and in order to correct the tone of flesh tint, $|F_1|\times Kf$ is added to flesh tint in the flesh tint chromaticness direction.

Figure 11:
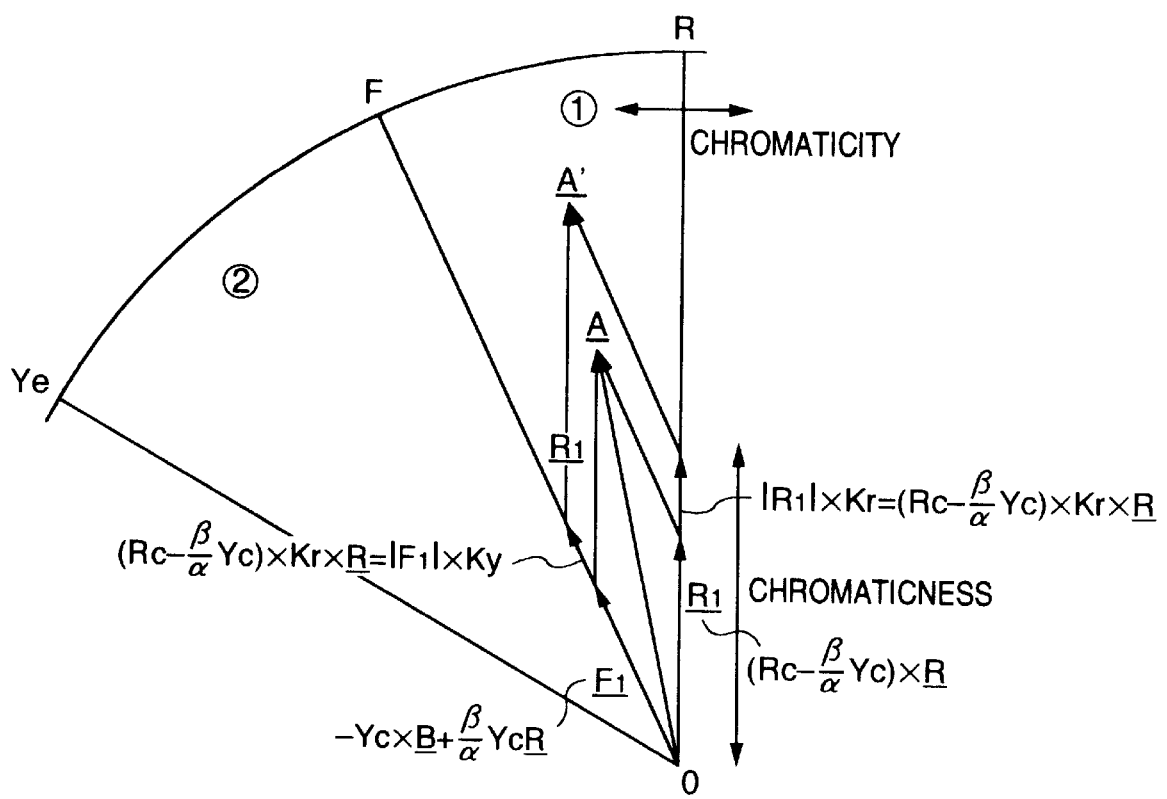
FIG. 11 is a hue diagram showing the concept of chromaticness correction of an input signal according to an embodiment of the invention.

Namely, as shown in FIG. 11, after the tone correction of R and flesh tint in the chromaticness direction is performed, the input image signal vector $\underline{A}'$ becomes:

$$\underline{A}'=\underline{R}_1+|\underline{R}_1|\times Kr+\underline{F}_1+|\underline{F}_1|\times Kf$$

The method of calculating the values $|\underline{R}_1|$ and $|\underline{F}_1|$ and the method of adding the correction values in the flesh tint chromaticness direction will be described. In this invention, correction of the components along the auxiliary standard axis is represented by reduced values to the R, G, and B components. Therefore, the correction concept of the conventional six-color independent correction method can be applied directly to correction of the components along the auxiliary standard axis. Namely, if flesh tint is used as the auxiliary standard color as in this embodiment, correction of flesh tint is reduced to R, G, and B components.

It is assumed that the constants for the 6th area is α and β and the fundamental vector $\underline{F}$ of flesh tint components is given by the following equation (2).

$$\underline{F}=\alpha\times\underline{Y}+\beta\times\underline{R}=\alpha\times(-\underline{B})+\beta\times\underline{R} \qquad (2)$$

Figure 2:
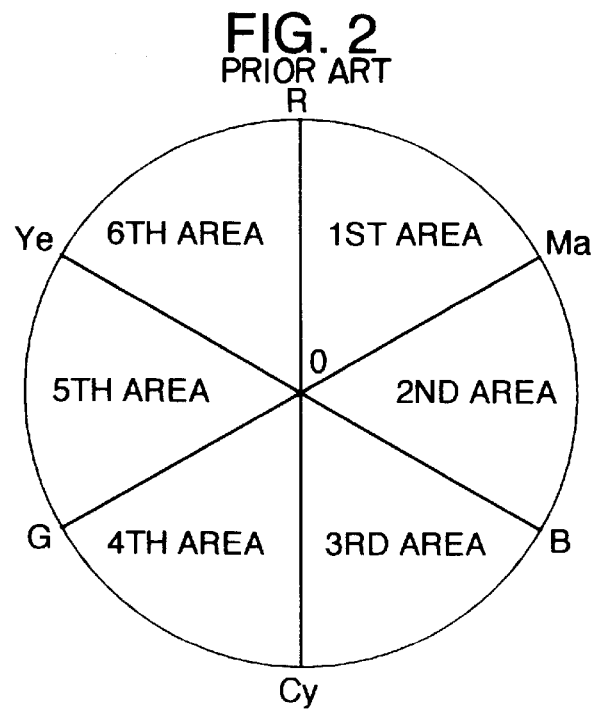
FIG. 2 is a conceptual diagram showing hue areas.

As seen from FIG. 2, the direction of the fundamental vector $\underline{Y}$ is opposite to that of the fundamental vector $\underline{B}$. Similarly, the direction of the fundamental vector $\underline{R}$ is opposite to that of the fundamental vector $\underline{Cy}$, and the direction of the fundamental vector $\underline{G}$ is opposite to that of the fundamental vector $\underline{Ma}$. Therefore, $\underline{Y}=-\underline{B}$, $\underline{R}=-\underline{Cy}$, and $\underline{G}=-\underline{Ma}$.

Since $\underline{F}=\alpha\times\underline{Y}+\beta\times\underline{R}$, the constants α and β satisfy the relationship of $\alpha/\beta=\sin\theta_o/\sin(60°-\theta_o)$ (refer to FIG. 9).

The coordinate vector $\underline{A}$ of the input image signal in the area (1) is represented by a composition of R and Ye components as in the following.

Since the input image signal is in the 6th area, the primary color component quantity is Rc and the complementary color component quantity is Yc. The coordinate vector $\underline{A}$ of the input image signal is given by the equation (3).

$$\underline{A}=\underline{Y}\times Yc+\underline{R}\times Rc \qquad (3)$$

Figure 3:
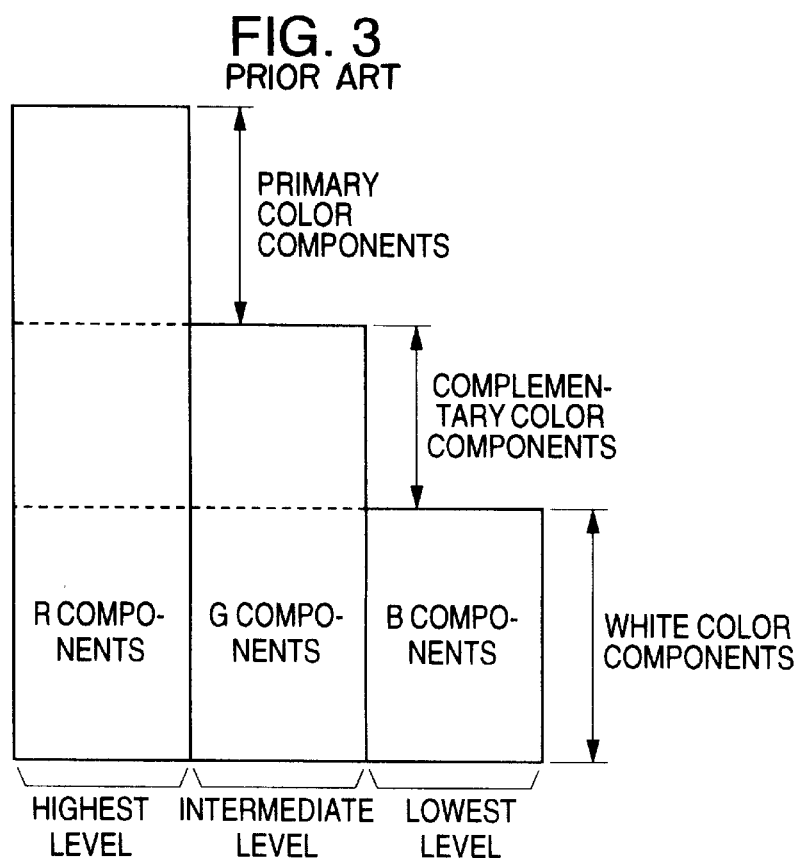
FIG. 3 is a diagram illustrating the principle of calculating primary and complementary components.
Figure 5:
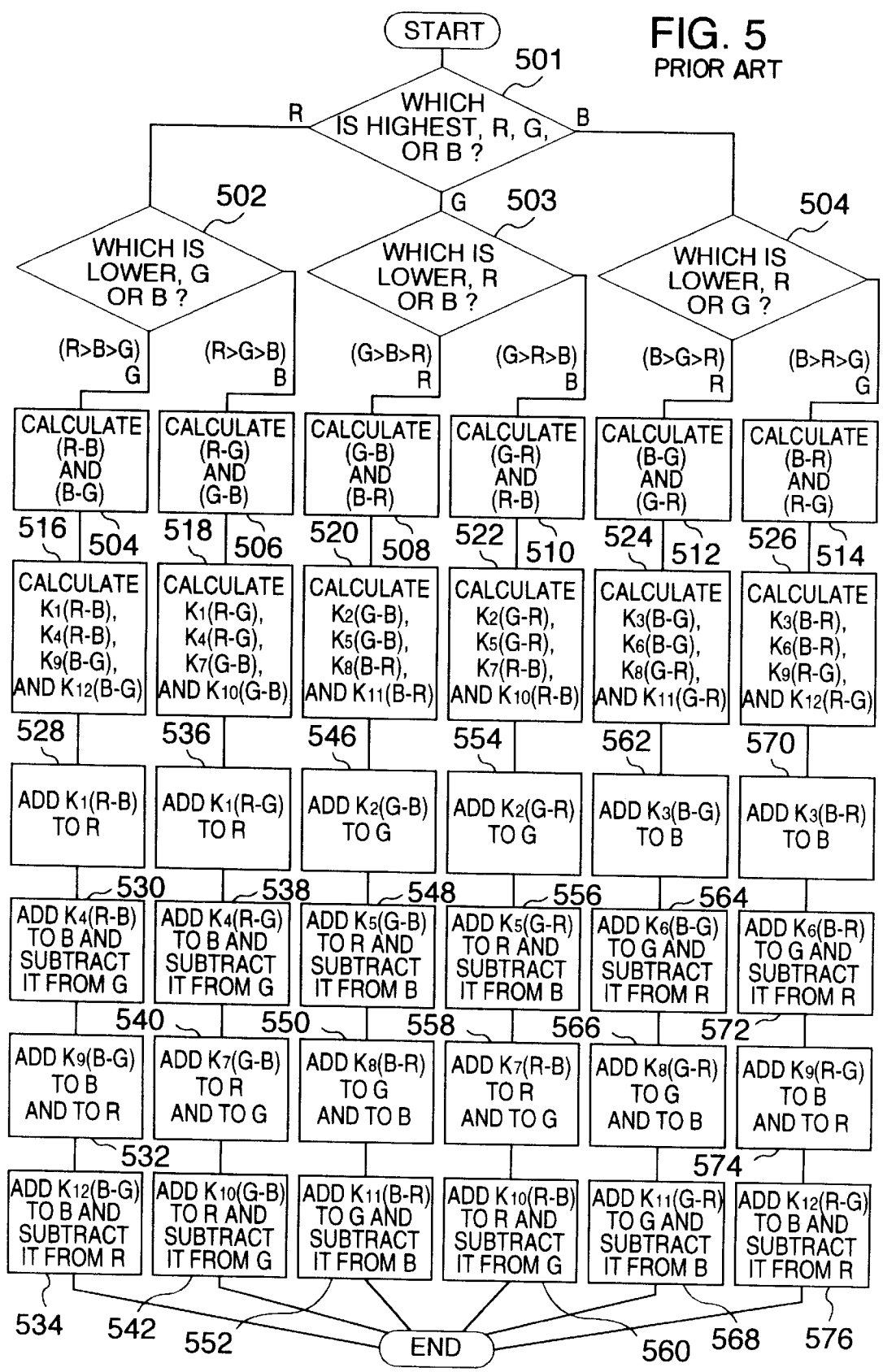
FIG. 5 is a flow chart illustrating a tone correction process of a conventional six-color independent tone correction method.

Since the input image signal is in the 6th area, it stands R>G>B, and as seen from FIG. 3, it stands Rc=R−G and Yc=G−B.

From the equation (2), it stands $\underline{Y}=(1/\alpha)\times(\underline{F}-\beta\times\underline{R})$. By substituting this into the equation (3), the vector $\underline{A}$ is given by the following equation (4).

$$\underline{A} = \underline{Y}\times Yc + \underline{R}\times Rc = (1/\alpha)\times(\underline{F}-\beta\times\underline{R})\times Yc + \underline{R}\times Rc \qquad (4)$$

$$= \underline{F}\times Yc/\alpha + \underline{R}\times(Rc-\beta\times Yc/\alpha)$$

Since $\underline{A}=\underline{F}\times|\underline{F}_1|+\underline{R}\times|\underline{R}_1|$, by using the equation (4), $|\underline{F}_1|$ and $|\underline{R}_1|$ are given by the following equations (5) and (6).

$$|\underline{R}_1|=Rc-\beta\times Yc/\alpha \qquad (5)$$

$$|\underline{F}_1|=Yc/\alpha \qquad (6)$$

In order to perform tone correction of R in the chromaticness direction, the following equation (7) is added to R, the equation (7) being obtained by multiplying the R component vector $\underline{R}_1$ of the vector $\underline{A}$ by the gain coefficient Kr (refer to FIG. 9).

$$|\underline{R}_1|\times Kr=(Rc-\beta\times Yc/\alpha)\times Kr \qquad (7)$$

By setting the coefficient Kr to a desired value, desired tone correction of R in the chromaticness direction can be performed.

Next, tone correction of flesh tint in the chromaticness direction is performed in the following manner.

In order to perform tone correction of flesh tint in the chromaticness direction, the following equation (8) is added to F, the equation (8) being obtained by multiplying the F component vector $\underline{F}_1$ of the vector $\underline{A}$ by the gain coefficient Kf.

$$|\underline{F}_1|\times Kf \qquad (8)$$

By expressing the F components $\underline{F}\times Yc/\alpha$ of the vector $\underline{A}$ of the equation (4) by using the vectors $\underline{R}$ and $\underline{B}$, the following equation (9) is obtained.

$$\underline{F}\times Yc/\alpha=(\alpha\times(-\underline{B})+\beta\times\underline{R})\times Yc/\alpha=\underline{B}\times(-Yc)+\underline{R}\times(\beta\times Yc/\alpha) \qquad (9)$$

Therefore, the correction components of the vector $\underline{A}$ in the flesh tint chromaticness direction is given by the following equation (10) (refer to FIG. 9).

$$|\underline{F}_1|\times Kf = |\underline{F}_1|\times Yc/\alpha\times Kf \qquad (10)$$

$$= \underline{B}\times(-Yc)\times Kf + \underline{R}\times(\beta\times Yc/\alpha)\times Kf$$

This means that correction of the vector $\underline{A}$ shown in the equation (8) in the flesh tint chromaticness direction is equivalent to an addition of $(-Yc) \times Kf$ to B and an addition of $(\beta = Yc/\alpha) \times Kf$ to R.

As described above, since $\alpha = \sin(60° - \theta_o) = \beta \times \sin(\theta_o)$, it stands $$\beta/\alpha = \sin(60° - \theta_o)/\sin(\theta_o)$$

where $\theta_o$ is an angle between the R vector and the flesh tint vector.

Therefore, if $\theta_o = 20°$, then $\beta/\alpha = 1.8794$.

Assuming that $\beta/\alpha \approx 2.0$, for the tone correction of R in the chromaticness direction, R is added with $$(Rc - 2 \times Yc) \times Kr,$$

and for the tone correction of flesh tint in the chromaticness direction, B is added with $$-Yc \times Kf,$$

and R is added with $$2 \times Yc \times Kf.$$

By changing $\beta/\alpha$, the flesh tint standard axis can be adjusted.

As described above, for the tone correction of R in the chromaticness direction, the component quantity $(Rc - B \times Yc/\alpha)$ of the vector $\underline{R}$ multiplied by the gain coefficient Kr is added to R. In this manner, the correction of R in the chromaticness direction can be performed independently while preserving the flesh tint component quantity.

The correction of flesh tint in the chromaticness direction is similar to the above, and the correction of flesh tint in the chromaticness direction can be performed independently while preserving the R component quantity.

The above description pertains to the correction in the chromaticness direction. The same concept can be applied also to the correction in the chromaticity direction.

Correction in the chromaticity direction of an input image signal belonging to the area (1) will be described.

As seen from the hue coordinate system shown in FIG. 2, the correction in the chromaticity direction corresponds to correction perpendicular to the correction in the chromaticness direction. Therefore, if the correction quantity in the chromaticity direction is the same as that in the chromaticness direction, the correction vector in the chromaticity direction can be obtained through orthogonal transform calculation of the correction vector in the chromaticness direction.

The correction in the chromaticity direction is calculated under the same conditions as the correction in the chromaticness direction.

The coordinate vector $\underline{A}$ of the input image signal in the area (1) is given from the equation (4) as $\underline{A} = \underline{F} \times Yc/\alpha + \underline{R} \times (Rc - \beta \times Yc/\alpha)$. Since $\underline{F} = \alpha \times \underline{Y} + \beta \times \underline{R}$, the coordinate vector $\underline{A}$ is given by the following equation (11).

$$\underline{A} = \underline{F} \times Yc/\alpha + \underline{R} \times (Rc - \beta \times Yc/\alpha) \quad (11)$$
$$= (Yc \times \underline{Y} + \beta/\alpha \times Yc \times \underline{R}) + \underline{R} \times (Rc - \beta \times Yc/\alpha)$$

The orthogonal transform calculation of the vector $\underline{R}$ results in:

$$\underline{R} \times \underline{L} \rightarrow -\underline{G} + \underline{B} \quad (12)$$

where $\underline{L}$ is an orthogonal transform vector.

Figure 12:
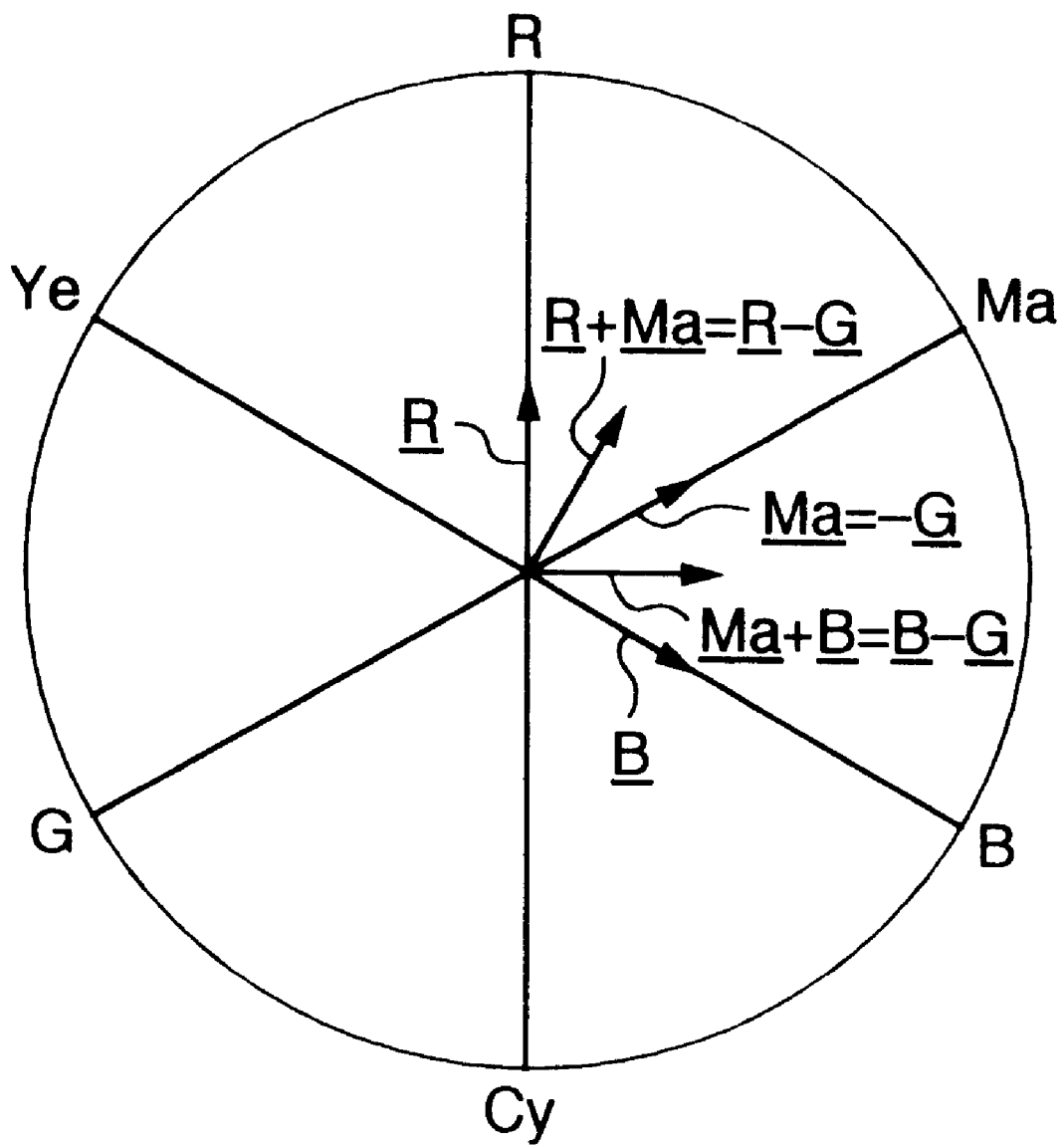
FIG. 12 is a conceptual diagram of hue areas.

As seen from the hue diagram shown in FIG. 12, the orthogonal vector $\underline{R} \times \underline{L}$ of the vector $\underline{R}$ is $\underline{Ma} + \underline{B} = \underline{B} - \underline{G}$ because $\underline{Ma} = -\underline{G}$.

Figure 13A:
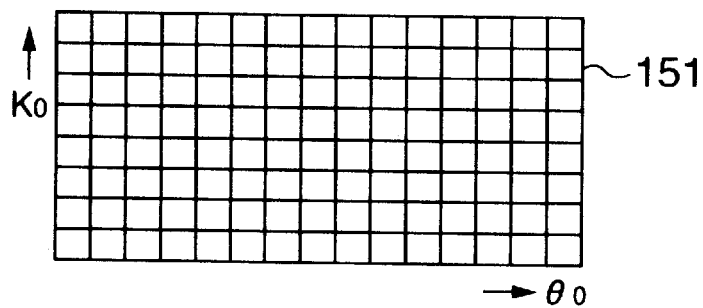
FIG. 13A is a diagram showing an example of a table stored in an intermediate color hue setting unit shown in FIG. 8.
Figure 13B:
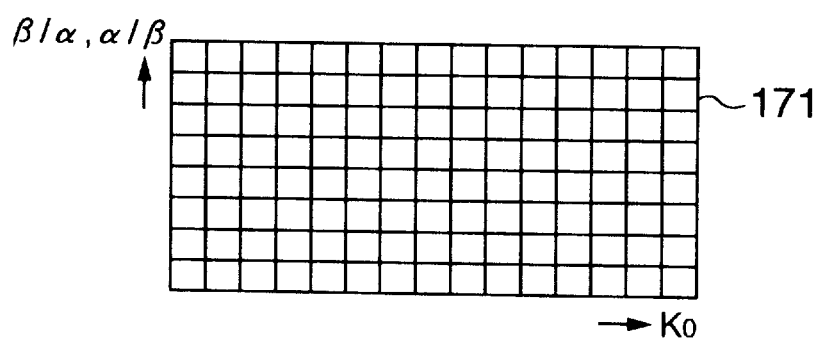
FIG. 13B is a diagram showing an example of a table stored in a constant calculating unit shown in FIG. 8.

Similarly, as seen from FIG. 13, the orthogonal vector $\underline{Y} \times \underline{L}$ of the vector $\underline{Y}$ is $\underline{R} + \underline{Ma} = \underline{R} - \underline{G}$.

Since $\underline{F} = \alpha \times \underline{Y} + \beta \times \underline{R}$ from the equation (2), the orthogonal vector $\underline{F} \times \underline{L}$ of the flesh tint vector $\underline{F}$ is given as in the following.

$$\underline{F} \times \underline{L} = (\alpha \underline{Y} + \beta \underline{R}) \times \underline{L} \quad (13)$$
$$= \alpha \underline{Y} \times \underline{L} + \beta \underline{R} \times \underline{L} \rightarrow$$
$$\alpha(\underline{R} - \underline{G}) + \beta(-\underline{G} + \underline{B})$$

Therefore, in order to perform tone correction of R in the chromaticity direction by using the formula (12), the R component quantity $(Rc - \beta \times Yc/\alpha)$ of the vector $\underline{A}$ multiplied by a specific constant Krh (gain constant for tone correction of R in the chromaticity direction) is subtracted from G and added to B.

Namely, $(Rc - \beta/\alpha \times Yc) \times Krh$ is subtracted from G and added to B.

Next, the tone correction of flesh tint in the chromaticity direction will be described. Since the flesh tint vector $\underline{F}$ is $Yc \times \underline{Y} + \beta/\alpha \times Yc \times \underline{R}$, $\underline{F} \times \underline{L}$ is given by:

$$\underline{F} \times \underline{L} = (Yc \times \underline{Y} + \beta/\alpha \times Yc \times \underline{R}) \times \underline{L} + ee = Yc \times + e, uns \; \underline{Y} \times \underline{L} + \beta/\alpha \times Yc \times \underline{R} \times \underline{L}$$

Since $\underline{Y} \times \underline{L} \rightarrow \underline{R} - \underline{G}$ and $\underline{R} \times \underline{L} \rightarrow -\underline{G} + \underline{B}$ as described previously, it stands:

$$\underline{F} \times \underline{L} = Yc \times \underline{R} - (1 + \beta/\alpha) \times Yc \times \underline{G} + \beta/\alpha \times Yc \times \underline{B} \quad (14)$$

Therefore, in order to perform tone correction of flesh tint in the chromaticity direction, $Yc \times Kfh$ is added to R, $(1 + \beta/\alpha) \times Yc \times Kfh$ is subtracted from G, and $\beta/\alpha \times Yc \times Kfh$ is added to B, where Kfh is a gain constant used for the tone correction of flesh tint F in the chromaticity direction.

As described above, if the input image signal is in the area (1), the tone correction quantity of flesh tint in the chromaticness direction is obtained by adding $Yc \times (\beta/\alpha) \times Kf$ to R and by adding $(-Yc) \times Kf$ to B. If the input image signal is in the area (1), the tone correction quantity of flesh tint in the chromaticity direction is obtained by adding $Yc \times Kfh$ to R, by adding $Yc \times (\beta/\alpha) \times Kfh$ to B, and by adding $-Yc \times (1 + \beta/\alpha) \times Kfh$ to G.

Correction of Image Signal Belonging to the Area (2)

In FIG. 10, point C is the coordinate position of the input image signal which is represented by a vector $\underline{C}$. This vector $\underline{C}$ is represented by a composition of an Ye component vector $\underline{Y}_1$ and a flesh tint component vector $\underline{F}_2$.

$$\underline{C} = \underline{Y}_1 + \underline{F}_2$$

A gain constant for adjusting Ye in the chromaticness direction is represented by Ky, and a gain constant for adjusting flesh tint in the chromaticness direction is represented by Kf.

In order to correct the tone of Ye in the chromaticness direction, since $\underline{Y} = -\underline{B}$, $|\underline{Y}_1| \times Ky$ is subtracted from the B component quantity of the input signal. In order to correct the tone of flesh tint in the chromaticness direction, $|\underline{F}_2| \times Kf$ is added to flesh tint in the flesh tint chromaticness direction.

Namely, after the tone correction of Ye and flesh tint in the chromaticness direction is performed, the input image signal vector $\underline{C}'$ becomes:

$$\underline{C}' = \underline{Y}_1 + |\underline{Y}_1| \times Ky + \underline{F}_2 + |\underline{F}_2| \times Kf$$

The method of calculating the values $|\underline{Y}_1|$ and $|\underline{F}_2|$ and the method of adding the correction values in the flesh tint chromaticness direction will be described. These methods are the same as the case used for the area (1). Therefore, the following equation (15) is obtained.

$$\underline{C} = \underline{Y} \times Yc + \underline{R} \times Rc \qquad (15)$$
$$= \underline{Y} \times Yc + (1/\beta) \times (\underline{F} - \alpha \times \underline{Y}) \times Rc$$
$$= \underline{F} \times Rc/\beta + \underline{Y} \times (Yc - \alpha \times Rc/\beta)$$

Therefore, it stands:

$$|Y_1| = Yc - \alpha \times Rc/\beta$$
$$|F_2| = Rc/\beta$$

If $\underline{F} \times Rc/\beta$ is expressed by the vectors $\underline{R}$ and $\underline{B}$, then:

$$\underline{F}Rc/\beta = (\alpha \times (-\underline{B}) + \beta \times \underline{R}) \times Rc/\beta = -\underline{B} \times (\alpha \times Rc/\beta) + \underline{R} \times Rc \qquad (16)$$

In summary, it can be said as in the following.

In order to perform tone correction of Ye in the chromaticness direction, B is subtracted by $$Y_1 | \times Ky = (Yc - \alpha \times Rc/\beta) \times Ky$$

In order to perform tone correction of flesh tint in the chromaticness direction, $$|F_2| \times Kf$$

is added in the flesh tint direction. This is equivalent to an addition of $(-\alpha \times Rc/\beta) \times Kf$ to B and an addition of $Rc \times Kf$ to R.

If the angle $\theta$ between the R vector and the flesh tint vector is set to 20° same as the case of the area (1), then $\alpha/\beta = 0.5321$. Assuming that $\alpha/\beta \approx 0.5$, for the tone correction of Ye in the chromaticness direction, B is subtracted by $$(Yc - 0.5 \times Rc) \times Ky,$$

and for the tone correction of flesh tint in the chromaticness direction, B is added with $$-0.5 \times Rc \times Kf,$$

and R is added with $$Rc \times Kf.$$

The above description pertains to the correction in the chromaticness direction. The same concept can be applied also to the correction in the chromaticity direction.

Correction in the chromaticity direction of an input image signal belonging to the area (2) will be described.

The correction in the chromaticity direction is calculated under the same conditions as the correction in the chromaticness direction.

The coordinate vector $\underline{C}$ of the input image signal in the area (2) is given from the equation (15) as $\underline{C} = \underline{Y} \times (Yc - \alpha/\beta \times Rc) + \underline{F} \times Rc/\beta$. Since $\underline{F} = \alpha \times \underline{Y} + \beta \times \underline{R}$, the coordinate vector $\underline{C}$ is given by the following equation (17).

$$\underline{C} = \underline{Y} \times (Yc - \alpha/\beta \times Rc) + (\underline{Y} \times Rc \times \alpha/\beta + Rc \times \underline{R}) \qquad (17)$$

As seen from FIG. 12, the orthogonal transform calculation of the vector $\underline{Y}$ results in:

$$Y \times \underline{L} \rightarrow -\underline{R} - \underline{G}$$

Therefore, the orthogonal transform calculation of the equation (17) in the Ye direction results in the following formula (18):

$$\underline{Y} \times \underline{L} \times (Yc - \alpha/\beta \times Rc) \rightarrow \underline{R} - \underline{G} \times (Yc - \alpha/\beta \times Rc) \qquad (18)$$

Similarly, the orthogonal transform calculation of the equation (17) in the F direction results in the following formula (19):

$$(\underline{Y} \times Rc \times \alpha/\beta + Rc \times \underline{R}) \times L \rightarrow \qquad (19)$$
$$Rc \times \alpha/\beta \times (\underline{R} - \underline{G}) + Rc \times (-\underline{G} + \underline{B}) =$$
$$Rc \times \alpha/\beta \times \underline{R} - (1 + \alpha/\beta) \times Rc \times \underline{G} + Rc \times \underline{R}$$

Therefore, in order to perform tone correction of Ye in the chromaticity direction by using the formula (18), $(Yc - \alpha/\beta \times Rc) \times Kyh$ is added to R and subtracted from G, where Kyh is the gain constant for the tone correction of Ye in the chromaticity direction.

In order to perform tone correction of flesh tint in the chromaticity direction, $\alpha/\beta \times Rc \times Kfh$ is added to R, $(1 + \alpha/\beta) \times Rc \times Kfh$ is subtracted from G, and $Rc \times Kfh$ is added to B, where Kfh is the gain constant for the tone correction of flesh tint F in the chromaticity direction.

As described above, if the input image signal is in the area (2), the tone correction quantity of flesh tint in the chromaticness direction is obtained by adding $Rc \times Kf$ to R and by adding $(-Rc) \times \alpha/\beta \times Kf$ to B. If the input image signal is in the area (2), the tone correction quantity of flesh tint in the chromaticity direction is obtained by adding $Rc \times (\alpha/\beta) \times Kfh$ to R, by adding $Rc \times Kfh$ to B, and by adding $-Rc \times (1 + \alpha/\beta) \times Kfh$ to G.

The structure and operation of an embodiment in which tone correction, in the chromaticness or chromaticity direction, of an input image signal in the area (1) or (2) of the 6th area is performed will be described with reference to FIG. 8 and other drawings.

Figure 1:
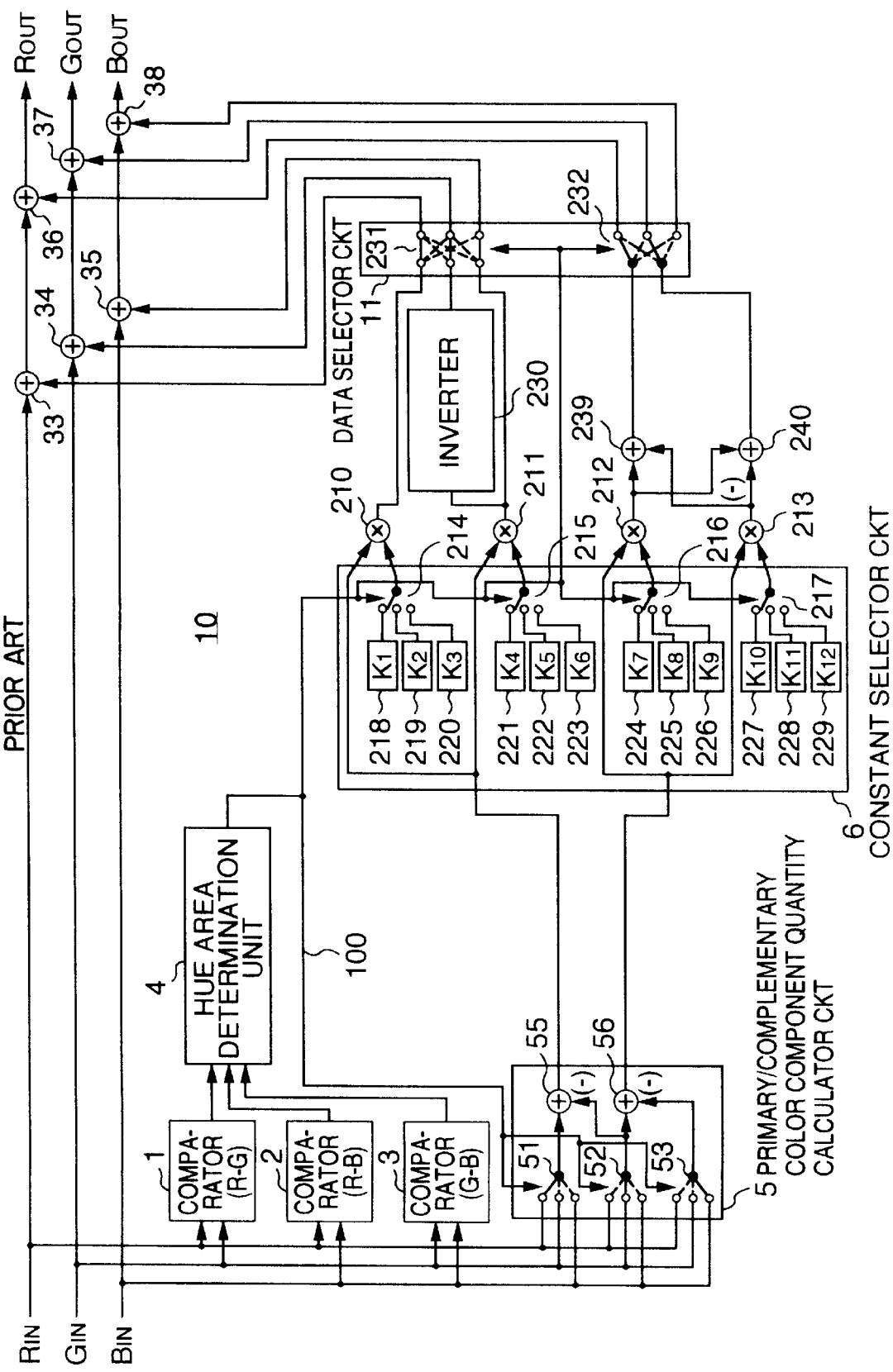
FIG. 1 is a block diagram showing the structure of a conventional tone correction apparatus for digital color image signals.

In FIG. 8, similar constituent elements having the same functions as those of the element shown in FIG. 1 are represented by using identical reference numerals, and the description thereof is omitted. As described previously, in this embodiment, although flesh tint is used for the correction of an intermediate color, any other desired intermediate color may be used.

A hue area determination unit 4A judges, from signals representative of the comparison results supplied from comparators 1, 2, and 3, whether the hue of the input signal belongs to the 6th area. Specifically, if the levels R, G, and B of the input signals $R_{IN}$, $G_{IN}$, and $B_{IN}$ are $R \geq G > B$, it judges that the hue of the input signal belongs to the 6th area, and outputs, for example, a high level signal 108 and outputs a low level signal 108 if the input signals R, G, and B have a relationship different from the above.

Selectors 51, 52, and 53 of a primary/complementary color component calculator circuit 5 do not output any of the input signals $R_{IN}$, $G_{IN}$, and $B_{IN}$ if the signal 108 has the low level. If the signal 108 has the high level, the selectors 51, 52, and 53 of the primary/complementary color component calculator circuit 5 output the input signals $R_{IN}$, $G_{IN}$, and $B_{IN}$. Therefore, if the signal 108 has the high level, the primary/complementary color component calculator circuit 5 outputs a signal 102 representative of the primary color component quantity $Rc = R - G$ and a signal 104 representative of a complementary color quantity $Yc = B - G$.

An intermediate color hue setting unit 15 can sets at least one auxiliary standard color (intermediate color) as a new standard color other than the six standard colors of the conventional techniques. In this embodiment, it sets a hue angle $\theta_o$ of flesh color (hue F) between R and Ye (refer to FIG. 9).

The hue angle $\theta_o$ of the intermediate color (flesh tint F) can be set externally from an input terminal 150. The intermediate color hue setting unit 15 has a conversion table 151 made of a RAM or the like shown in FIG. 13A, and reads a coefficient $K_o$ ($K_o$ has a value from 0 to 1) corresponding to the set hue angle $\theta_o$ and outputs it. The table 151 stores beforehand coefficients $K_o$ corresponding to hue angles $\theta_o$ (60>$\theta_o$>0).

The coefficient $K_o$ corresponding to each hue angle $\theta_o$ indicates a ratio of a primary color component quantity to a complementary color quantity of an input signal having the hue angle $\theta_o$, and is unanimously determined in correspondence with the hue angle $\theta_o$ as will be later described.

The coefficient $K_o$ is supplied to a constant calculator unit 17 which outputs a predetermined constant $\beta/\alpha$, $\alpha/\beta$ corresponding to the coefficient $K_o$. The constant calculator unit 17 has a conversion table made of a RAM or the like shown in FIG. 13B, reads the constant $\beta/\alpha$, $\alpha/\beta$ corresponding to the coefficient $K_o$ and outputs it. The table 171 stores beforehand the constants $\beta/\alpha$ and $\alpha/\beta$ corresponding to respective coefficients $K_o$. The value of the constant $\beta/\alpha$, $\alpha/\beta$ corresponding to the coefficient $K_o$ is obtained based on the relationship of $\alpha/\beta=\sin\theta_o/\sin(60-\theta_o)$.

In accordance with the signal 108 from the hue area determination unit 4A, the primary color component quantity signal 102 (Rc) and complementary color component quantity signal 104 (Yc) from the primary/complementary color component calculator circuit 5, and the coefficient $K_o$ from the intermediate color hue setting unit 15, a hue area determination circuit 16 judges whether the input image signal input to the tone correction apparatus and belonging to the 6th area belongs to the area (1) or (2), and outputs a signal S representative of the determination result. To this end, the hue area determination circuit 16 has a ratio calculator unit 161 and an area determination unit 162.

The ratio calculator unit 161 of the hue area determination circuit 16 receives the primary color component quantity Rc and complementary color quantity Yc from the primary/complementary color component calculator circuit 5 and calculates a ratio K of both levels.

First, a division is performed by using the larger one of the primary and complementary color component levels as a divisor (denominator), and the smaller one as a dividend (numerator). If an image is composed of only white components, both the levels are 0. In this case, for example, a flag is set to inform that there is no color components.

Assuming that the primary color component level is larger than the complementary color component level, dividend (numerator)=complementary color component level=A, and dividend (numerator)=primary color component level=B.

Figure 14:
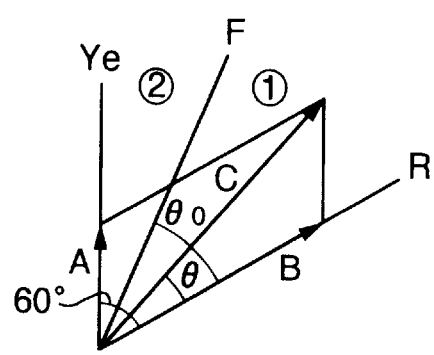
FIG. 14 is a diagram showing the relationship between the phase angle of an input image signal and its primary and complementary color components.

As shown in FIG. 14, assuming that the ratio $K_o$=A/B, the hue angle $\theta$ of the input signal relative to the primary color component is determined from the following equation.

$$\theta = \cos^{-1}(B + A/2)\Big/ \sqrt{(B^2 + A^2 + AB)}$$

$$= \cos^{-1}(1 + K/2)\Big/ \sqrt{(1 + K^2 + K)}$$

In the above manner, the coefficient K is unanimously determined for each hue angle $\theta$. Therefore, by comparing the coefficient K obtained by the ratio calculator unit 161 with the coefficient $K_o$ obtained by the intermediate color hue setting unit 15, it becomes possible to judge whether the hue angle $\theta$ of the input image signal is larger than the hue angle $\theta_o$ of the intermediate color (flesh tint). As shown in FIG. 14, if $\theta>\theta_o$, the input image signal belongs to the area (2), whereas if $\theta\leq\theta_o$, the input image signal belongs to the area (1). It is therefore possible to judge that if K>$K_o$, then the input image signal belongs to the area (2), whereas if K$\leq$$K_o$, then the input image signal belongs to the area (1).

The area determination unit 162 includes comparators and the like. The area determination unit 162 compares the coefficient K obtained by the ratio calculator unit 161 with the coefficient $K_o$ supplied from the intermediate color hue setting unit 15. If K>$K_o$, this unit 163 outputs a signal S, for example, of a low level, representative of that the input image signal belongs to the area (2). If K$\leq$$K_o$, this unit 163 outputs a signal S of a high level representative of that the input image signal belongs to the area (1). The area determination unit 162 outputs the signal S only when the signal 108 from the hue area determination unit 4A has the high level, i.e., only when the input image signal belongs to the 6th area.

A constant selector circuit 18 has a switch 181 which has input terminals 183 and 182 for receiving the constants $\beta/\alpha$ and $\alpha/\beta$ from the constant calculator unit 17. The constant selector circuit 18 selects one of the constants $\beta/\alpha$ and $\alpha/\beta$ in accordance with the signal S from the area determination unit 162. Namely, if the signal S has the high level (i.e., if the input image signal belongs to the area (1)), the constant selector circuit 18 selects and outputs the constant $\beta/\alpha$, whereas if the signal S has the low level (i.e., if the input image signal belongs to the area (2)), it selects and outputs the constant $\alpha/\beta$.

The structures of data selection adder/subtractor circuits 21A and 21B, data selection adder circuits 11A and 11B, and other circuits to be described hereinunder allow the tone correction of R and Ye in the 6th area in the chromaticness and chromaticity directions as well as the tone correction of flesh tint in the chromaticness and chromaticity directions.

In FIG. 8, an output of the constant selector circuit 18 is supplied to multipliers 19, 20, 25, and 26 which multiply the output by Rc, Yc, Rc, and Yc, respectively.

Figure 15:
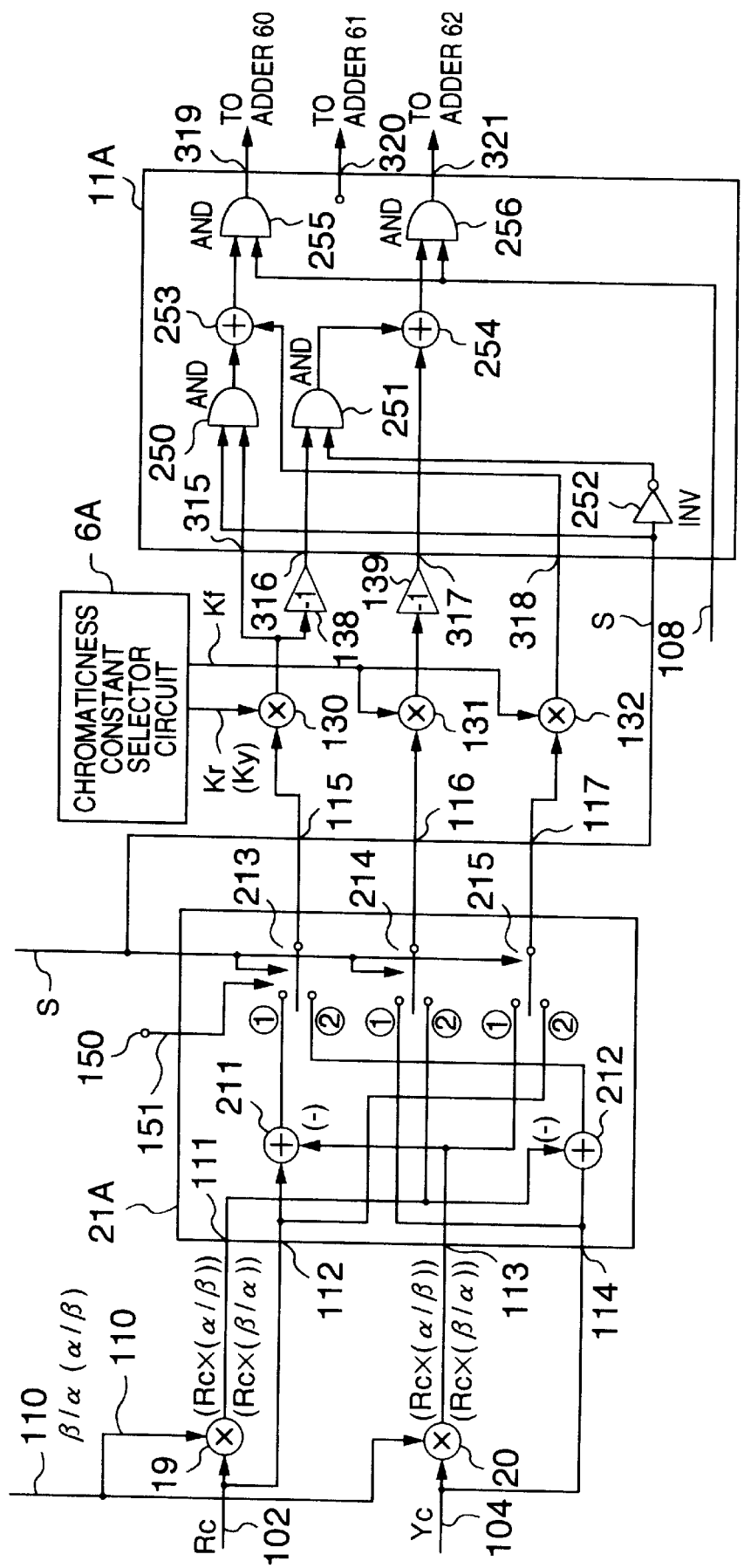
FIG. 15 is a circuit diagram showing an example of the structures of a data selection adder/subtractor circuit and a data selection adder circuit for chromaticness shown in FIG. 8.

An example of the structure of a chromaticness data selection adder/subtractor circuit 21A is shown in FIG. 15 and includes adders 211 and 212 and switches 213, 214, and 215. Input terminals 111 and 112 are supplied with Rc and an output of the multiplier 19 (Rc×$\beta/\alpha$ for the area (1) and Rc×$\alpha/\beta$ for the area (2)), and input terminals 113 and 114 are supplied with an output of the multiplier 20 (Yc×$\beta/\alpha$ for the area (1) and Yc×$\alpha/\beta$ for the area (2)) and Yc.

In this embodiment, a control signal 151 is not used. The switches 213, 214, and 215 are turned to terminal (1) sides when the signal S is high level, and turned to terminal (2) sides when the signal S is low level. Therefore, output signals from output terminals 115, 116, and 117 of the chromaticness data selection adder/subtractor circuit 21A are as shown in FIG. 16 if the input image signal belongs to the area (1) or (2).

The output signals from the output terminals 115, 116, and 117 are multiplied by the gain constants supplied from a chromaticness constant selector circuit 6A. Specifically, in response to the signal S, the chromaticness constant selector circuit 6A supplies the multiplier 130 with a gain constant Kr in the case of the area (1) and with a gain constant Ky in the case of the area (2). The chromaticness constant selector circuit 6A supplies the multipliers 131 and 132 with a gain constant Kf in both the cases of the areas (1) and (2). The gain constants Kr, Ky, and Kf supplied by the chromaticness constant selector circuit 6A can be set externally from an input terminal 165 to any desired values.

An output signal of the multiplier 130 is supplied directly and via a complementer 138 to a chromaticness data selection adder circuit 11A. An output signal of the multiplier 131 is supplied via a complementer 139 to the circuit 11A, and an output of the multiplier 132 is supplied directly to the circuit 11A.

As shown in FIG. 15, the chromaticness data selection adder circuit 11A includes an inverter 252, AND gates 250, 251, 255, and 256, and adders 253 and 254. The AND gates 255 and 256 of the chromaticness data selection adder circuit 11A are input with the signal 108 and they output a signal only when the input image signal is in the 6th area.

The signal S indicating that the input image signal belongs to the area (1) or (2) is supplied to the inverter 252 and AND gate 250.

Therefore, in the chromaticness data selection adder circuit 11A constructed as above, output signals from output terminals 319, 320, and 321 of this circuit 11A are as shown in FIG. 17 if the input image signal belongs to the area (1) or (2).

In this embodiment, since the flesh tint is used as the auxiliary standard color, no signal is output from the output terminal 320. However, if another intermediate color is set as the auxiliary standard color, a signal is output from this output terminal 320.

Figure 18:
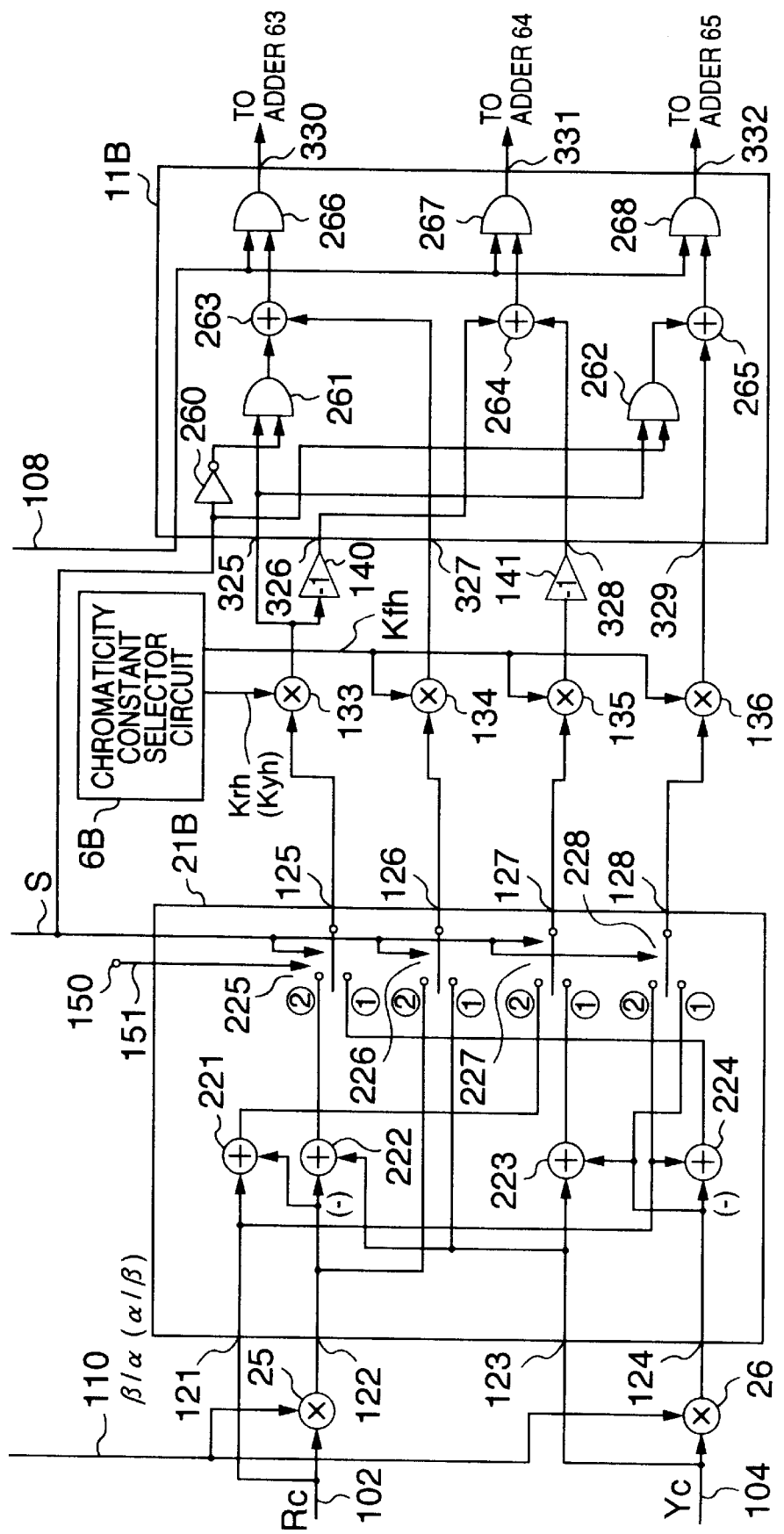
FIG. 18 is a circuit diagram showing an example of the structure of the data selection adder/subtractor circuit for chromaticity in which tone correction in the 6th area is executed by the embodiment apparatus shown in FIG. 8.

An example of the structure of a chromaticity data selection adder/subtractor circuit 21B is shown in FIG. 18 and includes adders 221, 222, 223, and 224 and switches 225, 226, 227, and 228. Input terminals 121 and 122 are supplied with Rc and an output of the multiplier 25 (Rc×β/α for the area (1) and Rc×α/β for the area (2)), and input terminals 123 and 124 are supplied with Yc and an output of the multiplier 26 (Yc×β/α for the area (1) and Yc×α/β for the area (2)).

In this embodiment, the control signal 151 is not used. The switches 225, 226, 227, and 228 are turned to terminal (1) sides when the signal S is high level, and turned to terminal (2) sides when the signal S is low level. Therefore, output signals from output terminals 125, 126, 127, and 128 of the chromaticity data selection adder/subtractor circuit 21B are as shown in FIG. 19 if the input image signal belongs to the area (1) or (2).

The output signals from the output terminals 125, 126, 127, and 128 are multiplied by the gain constants supplied from a chromaticity constant selector circuit 6B. Specifically, in response to the signal S, the chromaticity constant selector circuit 6B supplies the multiplier 133 with a gain constant Krh in the case of the area (1) and with a gain constant Kyh in the case of the area (2). The chromaticity constant selector circuit 6B supplies the multipliers 134, 135, and 136 with a gain constant Kfh in both the cases of the areas (1) and (2). The gain constants Krh, Kyh, and Kfh supplied by the chromaticity constant selector circuit 6B can be set externally from an input terminal 166 to any desired values.

An output signal of the multiplier 133 is supplied directly and via a complementer 140 to a chromaticity data selection adder circuit 11B. An output signal of the multiplier 135 is supplied via a complementer 141 to the circuit 11B, and outputs of the multipliers 134 and 136 are supplied directly to the circuit 11B.

As shown in FIG. 18, the chromaticity data selection adder circuit 11B includes an inverter 260, AND gates 261, 262, 266, 267, and 268, and adders 263, 264, and 265. The AND gates 266, 267, and 268 of the chromaticity data selection adder circuit 11B are input with the signal 108 and they output a signal only when the input image signal is in the 6th area.

The signal S indicating that the input image signal belongs to the area (1) or (2) is supplied to the inverter 260 and AND gate 262.

Therefore, in the chromaticity data selection adder circuit 11B constructed as above, output signals from output terminals 330, 331, and 332 of this circuit 11B are as shown in FIG. 20 if the input image signal belongs to the area (1) or (2).

Figure 6:
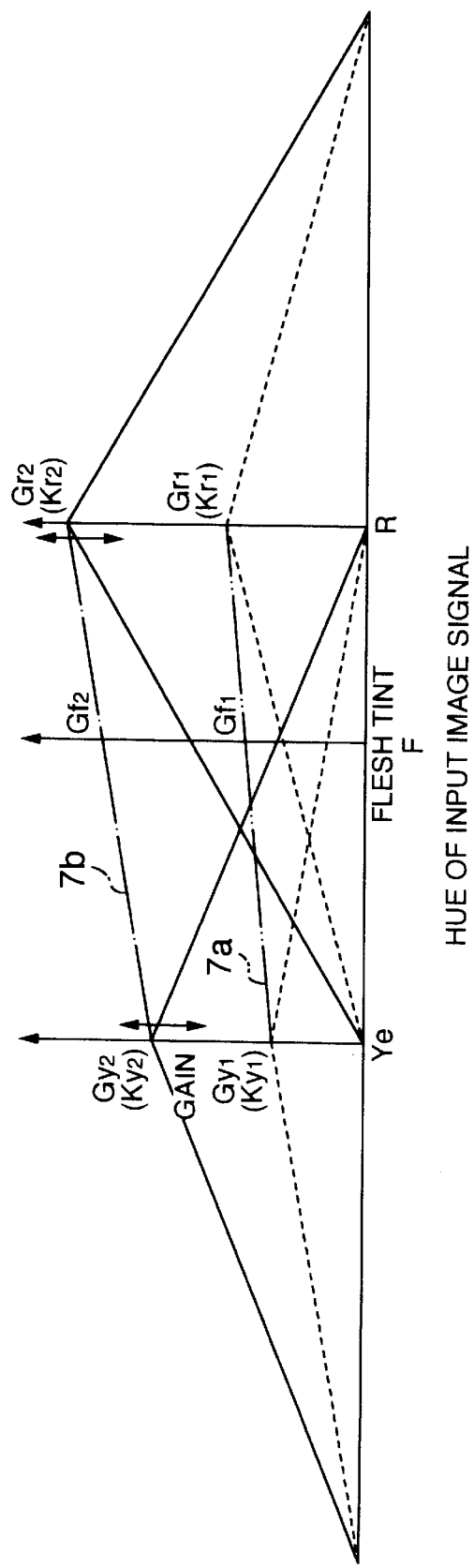
FIG. 6 is a tone correction characteristic diagram in the chromaticness direction according to conventional techniques.
Figure 21:
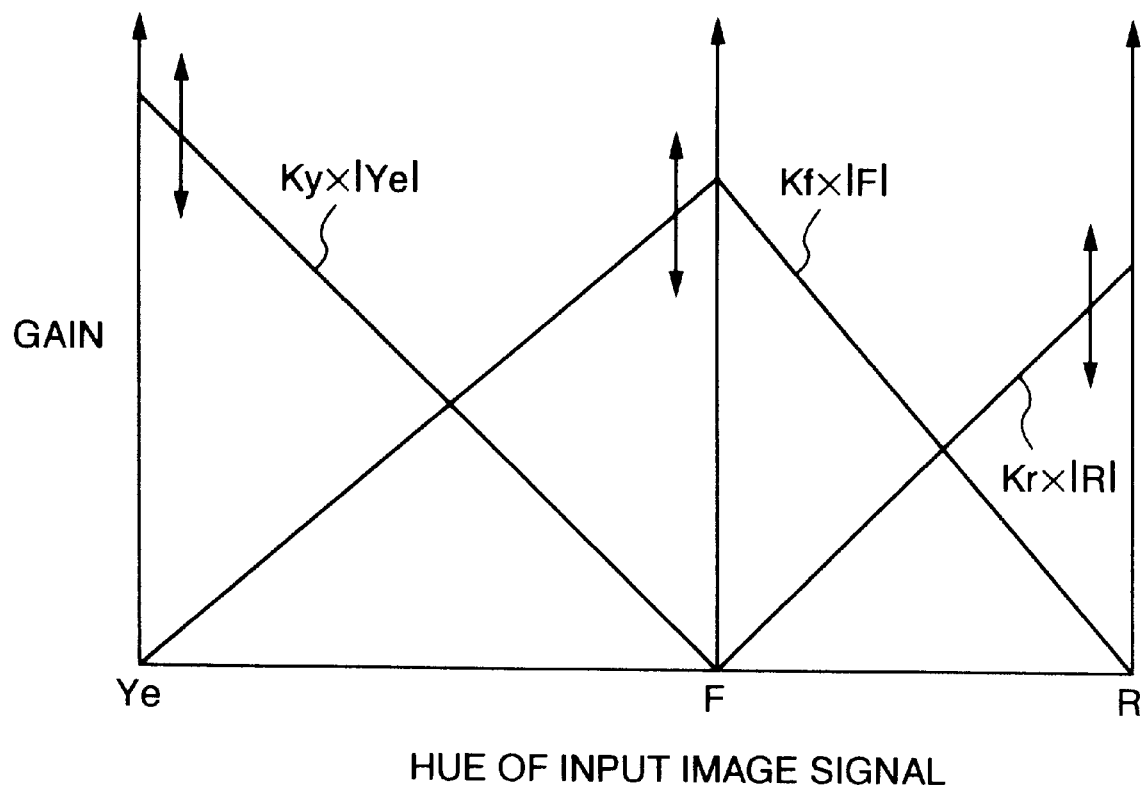
FIG. 21 is a tone correction characteristic diagram in the chromaticness direction in which tone correction in the 6th area is executed by the embodiment apparatus shown in FIG. 8.

FIG. 21 is a tone correction characteristic diagram in the chromaticness direction, for the tone correction apparatus of this embodiment wherein tone correction of R, Ye, and F in the 6th area along the standard axis can be independently performed. In this diagram, the gain characteristics of tone correction of R, Ye, and flesh tint in the chromaticness direction are shown superposed upon each other. As seen from this diagram, according to the tone correction apparatus of this embodiment, the gain characteristics are obtained which are an addition of the gain characteristics of tone correction of R, Ye, and flesh tint, and tone correction of R, Ye, and flesh tint can be performed independently. By adjusting the gain constants Kf and Kfh, the tone correction of flesh tint in the chromaticness and chromaticity directions can be performed independently. In this embodiment, as different from the tone correction characteristic diagram shown in FIG. 6, the gain of flesh tint in the chromaticness direction is not affected even if the gain of R or Ye in the chromaticness direction is changed. As compared to a conventional six-color independent tone correction method, effective tone correction of flesh tint is possible while minimizing the influence upon R and Ye.

If the tone correction apparatus 10 shown in FIG. 7 is structured to perform tone correction of standard colors only in the 1st to 5th areas and the tone correction apparatus 50 of this embodiment is connected in parallel to or in series with the tone correction apparatus 10, then a television camera capable of performing independent tone correction of seven colors (R, Ma, B, Cy, G, Ye, G) can be realized.

Next, a tone correction apparatus of another embodiment will be described in which tone correction of only flesh tint in the 6th area is performed. In this embodiment, although the structure shown in FIG. 8 is used, the following points are different from the embodiment shown in FIG. 8.

In this embodiment wherein tone correction of only flesh tint is performed, the output terminals 115 and 125 of the data selection adder/subtractor circuits 21A and 21B do not output signals so that the multipliers 130, 134, complementers 138, 140 and the like are not necessary and may be removed. Instead of removing them, the control signal 151 for invalidating the outputs 115 and 125 of the data selection adder/subtractor circuits 21A and 21B may be supplied from the terminal 150.

Since the tone correction of only flesh tint is performed in this embodiment, the output terminal 115 of the chromaticness data selection adder/subtractor circuit 21A does not deliver an output signal so that the adders 211, 212 and switch 213 are unnecessary and may be removed. Instead of removing them, the external control signal 151 may be applied to the switch 213 to turn it off.

In the chromaticness data selection adder circuit 11A, the multiplier 130 does not output any signal as described above so that the inverter 252, AND gates 250, 251, complementer 138, adders 243, 254 are unnecessary and may be removed.

Similarly, in the structure shown in FIG. 18, any signal is output from the output terminal 125 of the chromaticity data selection adder/subtractor 21B so that the adders 222, 224 and switch 225 are unnecessary and may be removed. Instead of removing them, the external control signal 151 may be applied to the switch 225 to turn it off.

Further, since any signal is output from the multiplier 133 of the chromaticity data selection adder circuit 11B, the inverter 260, AND gates 261, 262, complementer 140, and adders 263 and 264 are unnecessary and may be removed.

Therefore, in the tone correction apparatus 50 of this embodiment in which tone correction of an input image signal of only flesh tint in the 6th area is performed, input/output signals of the chromaticness and chromaticity data selector adder/subtractor circuits 21A and 21B and the chromaticness and chromaticity data selector adder circuits 11A and 11B in the operations in the areas (1) and (2) are as shown in FIGS. 22 to 25.

Specifically, output signals from the output terminals 115, 116, and 117 of the chromaticness data selection adder/subtractor circuit 21A when the input image signal belongs to the area (1) or (2) are given in FIG. 22.

Input signals to the input terminals 315, 316, 317, and 318 and output signals from the output terminals 319, 320, and 321, respectively of the chromaticness data selection adder circuit 11A when the input signal belongs to the area (1) or (2) are given in FIG. 23.

Output signals from the output terminals 125, 126, 127, and 128 of the chromaticity data selection adder/subtractor circuit 21B when the input image signal belongs to the area (1) or (2) are given in FIG. 24.

Input signals to the input terminals 325, 326, 327, 328, and 329 and output signals from the output terminals 330, 331, and 332, respectively of the chromaticity data selection adder circuit 11B when the input signal belongs to the area (1) or (2) are given in FIG. 25.

Figure 26:
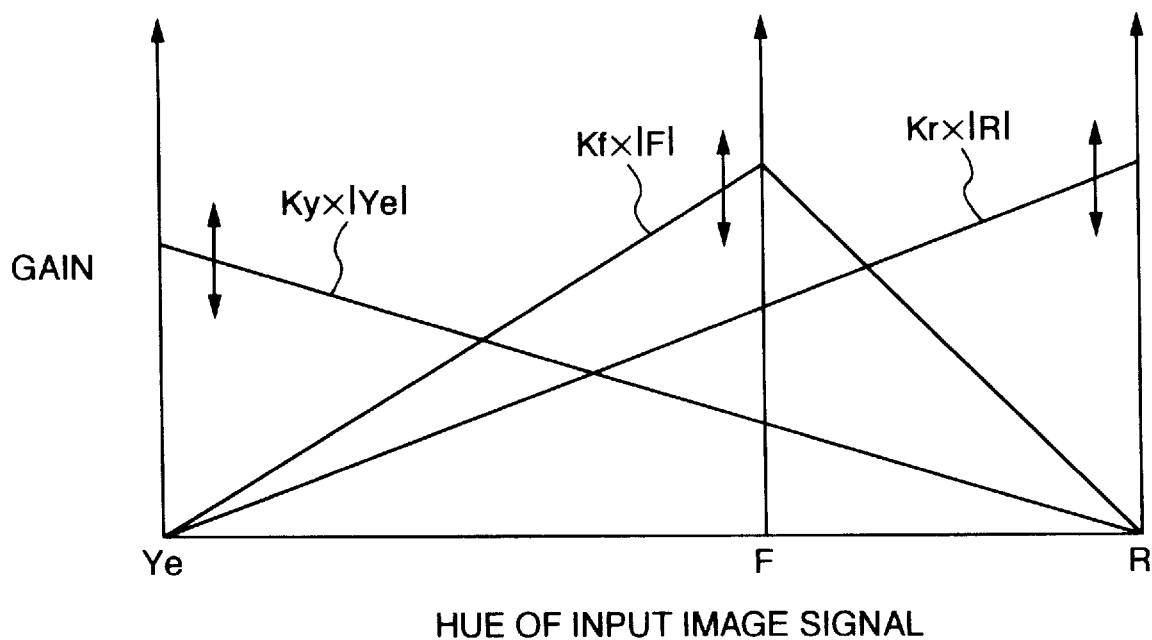
FIG. 26 is a tone correction characteristic diagram in the chromaticness direction in which tone correction of only flesh tint is executed, according to the other embodiment.

FIG. 26 is a tone correction characteristic diagram in the chromaticity direction in the 6th area, for a combination of the tone correction apparatus of this embodiment wherein tone correction of only F in the 6th area along the standard axis can be performed and a conventional six-color independent tone correction apparatus. In this diagram, the gain characteristics of tone correction of R and Ye in the chromaticness direction by the conventional tone correction apparatus and the gain characteristics of flesh tint in the chromaticness direction are shown superposed upon each other. As seen from this diagram, with a combination of the tone correction apparatus of this embodiment and the conventional tone correction apparatus, the gain characteristics are obtained which are an addition of the gain characteristics of tone correction of R, Ye, and flesh tint, and tone correction of flesh tint can be performed independently. By adjusting the gain constants Kf and Kfh, the tone correction of flesh tint in the chromaticness and chromaticity directions can be performed independently. In this embodiment, since the tone correction of flesh tint can be performed independently in the chromaticness and chromaticity directions, as different from the tone correction characteristic diagram shown in FIG. 6, the gain of flesh tint in the chromaticness direction can be controlled independently without affecting the gain of R and Ye in the chromaticness direction. As compared to a conventional six-color independent tone correction method, effective tone correction of flesh tint is possible while minimizing the influence upon R and Ye.

If the tone correction apparatus 10 shown in FIG. 7 is structured to perform tone correction of standard colors in all the 1st to 6th areas and the tone correction apparatus 50 of this embodiment is connected in parallel to or in series with the tone correction apparatus 10, then a television camera capable of performing independent tone correction of six colors (R, Ma, B, Cy, G, Ye) and capable of performing independent tone correction of flesh tint can be realized.

In the description of the above embodiments, the range of hue is limited between R and Ye. It is obvious that the invention is applicable to any desired hue, and that the kind and number of standard colors are set as desired.

According to the present invention, effective tone correction of intermediate color (color between primary color and complementary color) which has been conventionally difficult to be corrected, can be performed without any influence upon primary and complementary colors. Therefore, if the invention is applied to correction of flesh color, images of excellent quality can be easily obtained while suppressing generation of uneasiness of visual sense to be caused by switching between television cameras.

According to the present invention, since the intermediate color to be corrected can be selected as desired, it is possible to realize specific image effects through tone correction and to perform high grade image processing.

What is claimed is:

1. A tone correction apparatus for correcting the tone of an input color image signal independently of each of a plurality of hue areas divided by a plurality of standard axes passing through a plurality of standard colors set on a hue coordinate system, comprising:

means for judging whether the hue of an input color image signal belongs to which one of first and second auxiliary hue areas, the first and second auxiliary hue areas being one of the plurality of hue areas divided by an auxiliary standard axis of an auxiliary standard color; and means for independently performing, when said judging means judges that the hue of the input color image signal belongs to one of the first and second auxiliary hue areas, tone correction of the input color image signal with respect to color components along one standard axis of the plurality of standard axes surrounding the one auxiliary hue area to which the hue of the input color image signal belongs and along the auxiliary standard axis.

2. A tone correction apparatus according to claim 1, wherein said tone correcting means includes means for performing tone correction of the color component along the auxiliary standard axis, by decomposing the component along the auxiliary standard axis into components along the two standard axes surrounding the auxiliary standard axis, and by performing tone correction of the factorized components along the two standard axes.

3. A tone correction apparatus according to claim 1, wherein said tone correcting means includes chromaticness correcting means for independently performing tone correction of chromaticness of each component along the one standard axis and along the auxiliary standard axis, and chromaticity correcting means for independently performing tone correction of chromaticity of each component along the one standard axis and along the auxiliary standard axis.

4. A tone correction apparatus according to claim 1, wherein the plurality of standard axes include six standard axes each passing through each hue of standard colors including red, magenta, blue, cyan, green, and yellow, and the auxiliary standard axis is a standard axis passing the auxiliary standard color set to at least one hue area of the plurality of hue areas.

5. A tone correction apparatus according to claim 1, wherein the auxiliary standard color is flesh tint.

6. A tone correction apparatus for correcting the tone of an input color image signal independently of each of a plurality of hue areas divided by a plurality of standard axes passing through a plurality of standard colors set on a hue coordinate system, comprising:

means for judging whether the hue of an input color image signal belongs to which one of first and second auxiliary hue areas, the first and second auxiliary hue areas being one of the plurality of hue areas divided by an auxiliary standard axis of an auxiliary standard color; and means for performing, when said judging means judges that the hue of the input color image signal belongs to one of the first and second auxiliary hue areas, tone correction of the input color image signal with respect to color components along the auxiliary standard axis independently from color components along each of the plurality of standard axes.

7. A tone correction apparatus according to claim 6, wherein:

the auxiliary standard color is flesh tint, and the two colors of the two standard axes surrounding the auxiliary standard axes are red and yellow; and said tone correcting means includes chromaticness correcting means for correcting chromaticness of color components along the auxiliary standard axis and chromaticity correcting means for correcting chromaticity of color components along the auxiliary standard axis, said chromaticness correcting means comprises:

means for adding, when it is judged that the hue of the input color image signal belongs to the auxiliary hue area between red and flesh tint, $Yc \times (\beta/\alpha) \times Kf$ to a red image signal of the input color image signal and adding $-Yc \times Kf$ to a blue image signal of the input color image signal; and means for adding, when it is judged that the hue of the input color image signal belongs to the auxiliary hue area between yellow and flesh tint, $Rc \times Kf$ to a red image signal of the input color image signal and adding $-Rc \times (\alpha/\beta) \times Kf$ to a blue image signal of the input color image signal, and said chromaticity correcting means comprises:

means for adding, when it is judged that the hue of the input color image signal belongs to the auxiliary hue area between red and flesh tint, $Yc \times Kfh$ to a red image signal of the input color image signal, adding $Yc \times (\beta/\alpha) \times Kfh$ to a blue image signal of the input color image signal, and adding $-Yc \times (1+\beta/\alpha) \times Kfh$ to a green signal of the input color image signal; and means for adding, when it is judged that the hue of the input color image signal belongs to the auxiliary hue area between yellow and flesh tint, $Rc \times (\alpha/\beta) \times Kfh$ to a red image signal of the input color image signal, adding $Rc \times Kfh$ to a blue image signal of the input color image signal, and adding $-Rc \times (1+\alpha/\beta) \times Kfh$ to a green image signal of the input color image signal, and wherein $Rc=R-G$ and $Yc=B-G$ where R, G, and B are levels of red, green, and blue components of the input color image signal, $\alpha$ and $\beta$ are predetermined values, and Kf and Kfh are gain coefficients to be used for the correction of flesh tint in chromaticness and chromaticity directions.

8. A tone correction apparatus for correcting the tone of an input color image signal independently of each of a plurality of hue areas divided by a plurality of standard axes passing through a plurality of standard colors set on a hue coordinate system, comprising:

means for judging whether the hue of an input color image signal belongs to which one of first and second auxiliary hue areas, the first and second auxiliary hue areas being one of the plurality of hue areas divided by an auxiliary standard axis of an auxiliary standard color;

means for decomposing, when said judging means judges that the hue of the input color image signal belongs to one of the first and second auxiliary hue areas, color components of the input color image signal into components along one standard axis of the plurality of standard axes surrounding the one auxiliary hue area to which the hue of the input color image signal belongs and along the auxiliary standard axis; and means for independently performing tone correction of the decomposed components along the one standard axis and along the auxiliary standard axis.

9. A television camera for taking an image of a subject and outputting a color image signal, comprising:

an image pickup element for taking an image of a subject and outputting a color image signal;

an analog processing unit for analog processing the color image signal output from said image pickup element;

an analog/digital converter for converting the analog processed color image signal into a digital color image signal;

a digital processing unit for digital processing the digital color image signal and outputting the digital processed signal; and a tone correction unit provided in said digital processing unit for correcting the tone of the digital color image signal independently of each of a plurality of hue areas divided by a plurality of standard axes passing through a plurality of standard colors set on a hue coordinate system, wherein said tone correction unit comprises:

means for judging whether the hue of an input color image signal belongs to which one of first and second auxiliary hue areas, the first and second auxiliary hue areas being one of the plurality of hue areas divided by an auxiliary standard axis of an auxiliary standard color; and means for independently performing, when said judging means judges that the hue of the input color image signal belongs to one of the first and second auxiliary hue areas, tone correction of the input color image signal with respect to color components along one standard axis of the plurality of standard axes surrounding the one auxiliary hue area to which the hue of the input color image signal belongs and along the auxiliary standard axis.

10. A television camera according to claim 9, wherein said tone correction unit further comprising means for independently performing, when said judging means judges that the hue of the input color image signal belongs to an area other than the first and second auxiliary hue areas, tone correction of the hue components of the input color image signal with respect to color components along one of the plurality of standard axes corresponding to the hue of the input color image signal.

11. A tone correction apparatus for correcting the tone of an input color image signal independently of each of a plurality of hue areas divided by a plurality of standard axes passing through a plurality of standard colors set on a hue coordinate system, comprising:

means for judging whether the hue of an input color image signal belongs to which one of first and second auxiliary hue areas, the first and second auxiliary hue areas being one of the plurality of hue areas divided by an auxiliary standard axis of an auxiliary standard color;

first tone correction means for independently performing, when said judging means judges that the hue of the input color image signal belongs to one of the first and second auxiliary hue areas, tone correction of the input color image signal with respect to color components along one standard axis of the plurality of standard axes surrounding the one auxiliary hue area to which the hue of the input color image signal belongs and along the auxiliary standard axis; and second tone correction means for independently performing, when said judging means judges that the hue of the input color image signal belongs to an area other than the first and second auxiliary hue areas, tone correction of the hue components of the input color image signal with respect to color components along one of the plurality of standard axes corresponding to the hue of the input color image signal.

12. A tone correction apparatus for correcting the tone of an input color image signal independently of each of a plurality of hue areas divided by a plurality of standard axes passing through a plurality of standard colors set on a hue coordinate system, comprising:

means for judging whether the hue of an input color image signal belongs to which one of first and second auxiliary hue areas, the first and second auxiliary hue areas being one of the plurality of hue areas divided by an auxiliary standard axis of an auxiliary standard color;

first tone correction means for independently performing, when said judging means judges that the hue of the input color image signal belongs to one of the first and second auxiliary hue areas, tone correction of the input color image signal with respect to color components along the auxiliary standard axis; and second tone correction means for independently performing tone correction of the input color image signal with respect to color components along one standard axis of the plurality of standard axes surrounding the one auxiliary hue area to which the hue of the input color image signal belongs and along the auxiliary standard axis; and second tone correction means for independently performing, when said judging means judges that the hue of the input color image signal belongs to an area other than the first and second auxiliary hue areas, tone correction of the hue components of the input color image signal with respect to color components along one of the plurality of standard axes corresponding to the hue of the input color image signal.

13. A tone correction apparatus for setting a plurality of hue areas divided by a plurality of standard axes passing through a plurality of standard colors set on a hue coordinate system and for correcting tone of an input color image signal as to each of said plurality of hue areas in accordance with independent characteristic of the each hue area, comprising:

means for setting first and second auxiliary hue areas by dividing one of the plurality of hue areas by an auxiliary standard axis of an auxiliary standard color and for determining whether hue of an input color image signal belongs to one of the first and second auxiliary hue areas; and means for decomposing, when said determining means determines that the hue of the input color image signal belongs to one of the first and second auxiliary hue areas, corresponding color component of the input color image signal to be tone corrected into a component along one standard axis of the plurality of standard axes surrounding the determined one auxiliary hue area to which the hue of the input color image signal belongs and a component along the auxiliary standard axis, and for independently performing tone correction of the decomposed component along the one standard axis and the decomposed component along the auxiliary standard axis.

14. A tone correction apparatus according to claim 13, wherein said tone correcting means includes means for performing tone correction of the color component along the auxiliary standard axis, by decomposing the component along the auxiliary standard axis into components along the two standard axes surrounding the auxiliary standard axis, and by performing tone correction of the factorized components along the two standard axes.

15. A tone correction apparatus according to claim 13, wherein said tone correcting means includes chromaticness correcting means for independently performing tone correction of chromaticness of each component along the one standard axis and along the auxiliary standard axis, and chromaticity correcting means for independently performing tone correction of chromaticity of each component along the one standard axis and along the auxiliary standard axis.

16. A tone correction apparatus according to claim 13, wherein the plurality of standard axes include six standard axes each passing through each hue of standard colors including red, magenta, blue, cyan, green, and yellow, and the auxiliary standard axis is a standard axis passing the auxiliary standard color set to at least one hue area of the plurality of hue areas.

17. A tone correction apparatus according to claim 13, wherein the auxiliary standard color is flesh tint.

18. A tone correction apparatus according to claim 13, wherein:

the auxiliary standard color is flesh tint, and the two colors of the two standard axes surrounding the auxiliary standard axes are red and yellow; and said tone correcting means includes chromaticness correcting means for correcting chromaticness of color components along the auxiliary standard axis and chromaticity correcting means for correcting chromaticity of color components along the auxiliary standard axis, said chromaticness correcting means comprises:

means for adding, when it is judged that the hue of the input color image signal belongs to the auxiliary hue area between red and flesh tint, $Yc \times (\beta/\alpha) \times Kf$ to a red image signal of the input color image signal and adding $-Yc \times Kf$ to a blue image signal of the input color image signal; and means for adding, when it is judged that the hue of the input color image signal belongs to the auxiliary hue area between yellow and flesh tint, $Rc \times Kf$ to a red image signal of the input color image signal and adding $-Rc \times (\alpha/\beta) \times Kf$ to a blue image signal of the input color image signal, and said chromaticity correcting means comprises:

means for adding, when it is judged that the hue of the input color image signal belongs to the auxiliary hue area between red and flesh tint, $Yc \times Kfh$ to a red image signal of the input color image signal, adding $Yc \times (\beta/\alpha) \times Kfh$ to a blue image signal of the input color image signal, and adding $-Yc \times (1+\beta/\alpha) \times Kfh$ to a green signal of the input color image signal; and means for adding, when it is judged that the hue of the input color image signal belongs to the auxiliary hue area between yellow and flesh tint, $Rc \times (\alpha/\beta) \times Kfh$ to a red image signal of the input color image signal, adding $Rc \times Kfh$ to a blue image signal of the input color image signal, and adding $-Rc \times (1+\alpha/\beta) \times Kfh$ to a green image signal of the input color image signal, and wherein $Rc=R-G$ and $Yc=B-G$ where R, G, and B are levels of red, green, and blue components of the input color image signal, $\alpha$ and $\beta$ are predetermined values, and Kf and Kfh are gain coefficients to be used for the correction of flesh tint in chromaticness and chromaticity directions.

19. A tone correction apparatus for setting a plurality of hue areas divided by a plurality of standard axes passing through a plurality of standard colors set on a hue coordinate system and for correcting tone of an input color image signal as to each of said plurality of hue areas in accordance with independent characteristics of the each hue area, comprising:

means for setting first and second auxiliary hue areas by dividing one of the plurality of hue areas by an auxiliary standard axis of an auxiliary standard color and for determining whether hue of an input color image signal belongs to one of the first and second auxiliary hue areas;

means for decomposing, when said determining means determines that the hue of the input color image signal belongs to one of the first and second auxiliary hue areas, corresponding color component of the input color image signal to be tone corrected into a component along one standard axis of the plurality of standard axes surrounding the one auxiliary hue area to which the hue of the input color image signal belongs and a component along the auxiliary standard axis; and means for independently performing tone correction of the decomposed component along the one standard axis and the decomposed component along the auxiliary standard axis.

20. A television camera for taking an image of a subject and outputting a color image signal, comprising:

an image pickup element for taking an image of a subject and outputting a color image signal;

an analog processing unit for analog processing the color image signal output from said image pickup element;

an analog/digital converter for converting the analog processed color image signal into a digital color image signal;

a digital processing unit for digital processing the digital color image signal and outputting the digital processed signal; and a tone correction unit provided in said digital processing unit for setting a plurality of hue areas divided by a plurality of standard axes passing through a plurality of standard colors set on a hue coordinate system and for correcting tone of the digital color image signal as to each of said plurality of hue areas in accordance with independent characteristic of the each hue area, wherein said tone correction unit comprises:

means for setting first and second auxiliary hue areas by dividing one of the plurality of hue areas by an auxiliary standard axis of an auxiliary standard color and for determining whether the hue of an input color image signal belongs to which one of first and second auxiliary hue areas; and means for decomposing, when said determining means determines that the hue of the input color image signal belongs to one of the first and second auxiliary hue areas, corresponding color components of the input color image signal to be tone corrected into a component along one standard axis of the plurality of standard axes surrounding the determined one auxiliary hue area to which the hue of the input color image signal belongs and a component along the auxiliary standard axis, and for independently performing tone correction of the decomposed component along the one standard axis and the decomposed component along the auxiliary standard axis.

21. A television camera according to claim 20, wherein said tone correction unit further comprising means for independently performing, when said determining means determines that the hue of the input color image signal belongs to an area other than the first and second auxiliary hue areas, tone correction of the color component of the input color image signal with respect to color component along one of the plurality of standard axes corresponding to the hue of the input color image signal.

22. A tone correction apparatus for setting a plurality of hue areas divided by a plurality of standard axes passing through a plurality of standard colors set on a hue coordinate system and for correcting tone of an input color image signal as to each of said plurality of hue areas in accordance with characteristics of the each hue area, comprising:

means for setting first and second auxiliary hue areas by dividing one of the plurality of hue areas by an auxiliary standard axis of an auxiliary standard color and for determining whether hue of an input color image signal belongs to one of the first and second auxiliary hue areas;

first tone correction means for decomposing, when said determining means determines that the hue of the input color image signal belongs to one of the first and second auxiliary hue areas, corresponding color component of the input color image signal to be tone corrected into a component along one standard axis of the plurality of standard axes surrounding the determined one auxiliary hue area to which the hue of the input color image signal belongs and a component along the auxiliary standard axis, and for independently performing tone correction of the decomposed component along the one standard axis and the decomposed component along the auxiliary standard axis; and second tone correction means for independently performing, when said determining means determines that the hue of the input color image signal belongs to an area other than the first and second auxiliary hue areas, tone correction of the color component of the input color image signal with respect to color component along one of the plurality of standard axes corresponding to the hue of the input color image signal.

23. A tone correction apparatus for setting a plurality of hue areas divided by a plurality of standard axes passing through a plurality of standard colors set on a hue coordinate system and for correcting tone of an input color image signal as to each of said plurality of hue areas in accordance with independent characteristics of the each hue area, comprising:

means for setting first and second auxiliary hue areas by dividing one of the plurality of hue areas by an auxiliary standard axis of an auxiliary standard color and for determining whether hue of an input color image signal belongs to one of the first and second auxiliary hue areas;

first tone correction means for decomposing, when said determining means determines that the hue of the input color image signal belongs to one of the first and second auxiliary hue areas, corresponding color components of the input color image signal to be corrected into a component along one standard axis of the plurality of standard axes surrounding the determined one auxiliary hue area to which the hue of the input color image signal belongs and a component along the auxiliary standard axis, and for independently performing tone correction of the decomposed component along the one standard axis and the decomposed component along the auxiliary standard axis; and second tone correction means for independently performing tone correction of the color component of the input color image signal with respect to color component along one of the plurality of standard axes corresponding to the hue of the input color image signal.

* * * * *